(12) United States Patent
Tsutsui

(10) Patent No.: US 12,332,449 B2
(45) Date of Patent: Jun. 17, 2025

(54) LIGHT GUIDE, OPTICAL UNIT, VIRTUAL IMAGE DISPLAY DEVICE, AND HEAD-MOUNTED DISPLAY

(71) Applicant: Takemasa Tsutsui, Kanagawa (JP)

(72) Inventor: Takemasa Tsutsui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 318 days.

(21) Appl. No.: 17/893,196

(22) Filed: Aug. 23, 2022

(65) Prior Publication Data
US 2023/0100029 A1    Mar. 30, 2023

(30) Foreign Application Priority Data

Sep. 10, 2021 (JP) ................................ 2021-147830

(51) Int. Cl.
    *G02B 27/01*       (2006.01)
    *F21V 8/00*       (2006.01)
    *G02B 17/00*       (2006.01)

(52) U.S. Cl.
CPC ....... *G02B 27/0172* (2013.01); *G02B 6/0018* (2013.01); *G02B 6/0028* (2013.01); *G02B 17/006* (2013.01); *G02B 6/0011* (2013.01); *G02B 2207/123* (2013.01)

(58) Field of Classification Search
CPC .. G02B 6/0028; G02B 6/0018; G02B 6/0058; G02B 6/0061; G02B 27/017; G02B 27/0172; G02B 27/30; G02B 17/006; G02B 2027/0123; G02B 2027/0125
See application file for complete search history.

(56) References Cited

U.S. PATENT DOCUMENTS

| | | | |
|---|---|---|---|
| 9,182,597 B2* | 11/2015 | Dominici | G02B 27/0101 |
| 10,983,264 B2* | 4/2021 | Danziger | G02B 27/145 |
| 2017/0090094 A1* | 3/2017 | Ohsugi | G02B 6/003 |
| 2017/0192239 A1 | 7/2017 | Nakamura et al. | |
| 2018/0203237 A1* | 7/2018 | Shih | G02B 6/0028 |
| 2019/0004235 A1 | 1/2019 | Ohsugi et al. | |
| 2020/0200963 A1 | 6/2020 | Eisenfeld et al. | |

(Continued)

FOREIGN PATENT DOCUMENTS

| | | |
|---|---|---|
| JP | 2021-504733 | 2/2021 |
| JP | 2022-020912 | 2/2022 |
| WO | WO2019/102366 A1 | 5/2019 |

*Primary Examiner* — Uyen Chau N Le
*Assistant Examiner* — Darby M. Thomason
(74) *Attorney, Agent, or Firm* — XSENSUS LLP

(57) ABSTRACT

A light guide includes: a first light guide portion including: an optical entrance; and multiple reflecting surfaces including at least one first reflecting surface and at least one second reflecting surface, the multiple reflecting surfaces configured to separate a light flux entered through the optical entrance, into multiple light fluxes; and a second light guide portion including an optical exit. The second light guide portion is configured to cause the multiple light fluxes to propagate therethrough and exit from the optical exit. A part of the light flux strikes and reflects off the at least one first reflecting surface to propagate into the second light guide portion. Another part of the light flux strikes and reflects off the at least one second reflecting surface without striking the at least first reflecting surface, to propagate into the second light guide portion.

18 Claims, 16 Drawing Sheets

(56) References Cited

U.S. PATENT DOCUMENTS

| | | |
|---|---|---|
| 2020/0400954 A1 | 12/2020 | Tanaka et al. |
| 2020/0400962 A1 | 12/2020 | Hirano et al. |
| 2021/0165221 A1 | 6/2021 | Hasegawa et al. |
| 2022/0026716 A1 | 1/2022 | Sudoh et al. |
| 2022/0057640 A1 | 2/2022 | Nakamura et al. |
| 2023/0393398 A1* | 12/2023 | Oh .......................... G06F 3/013 |

* cited by examiner

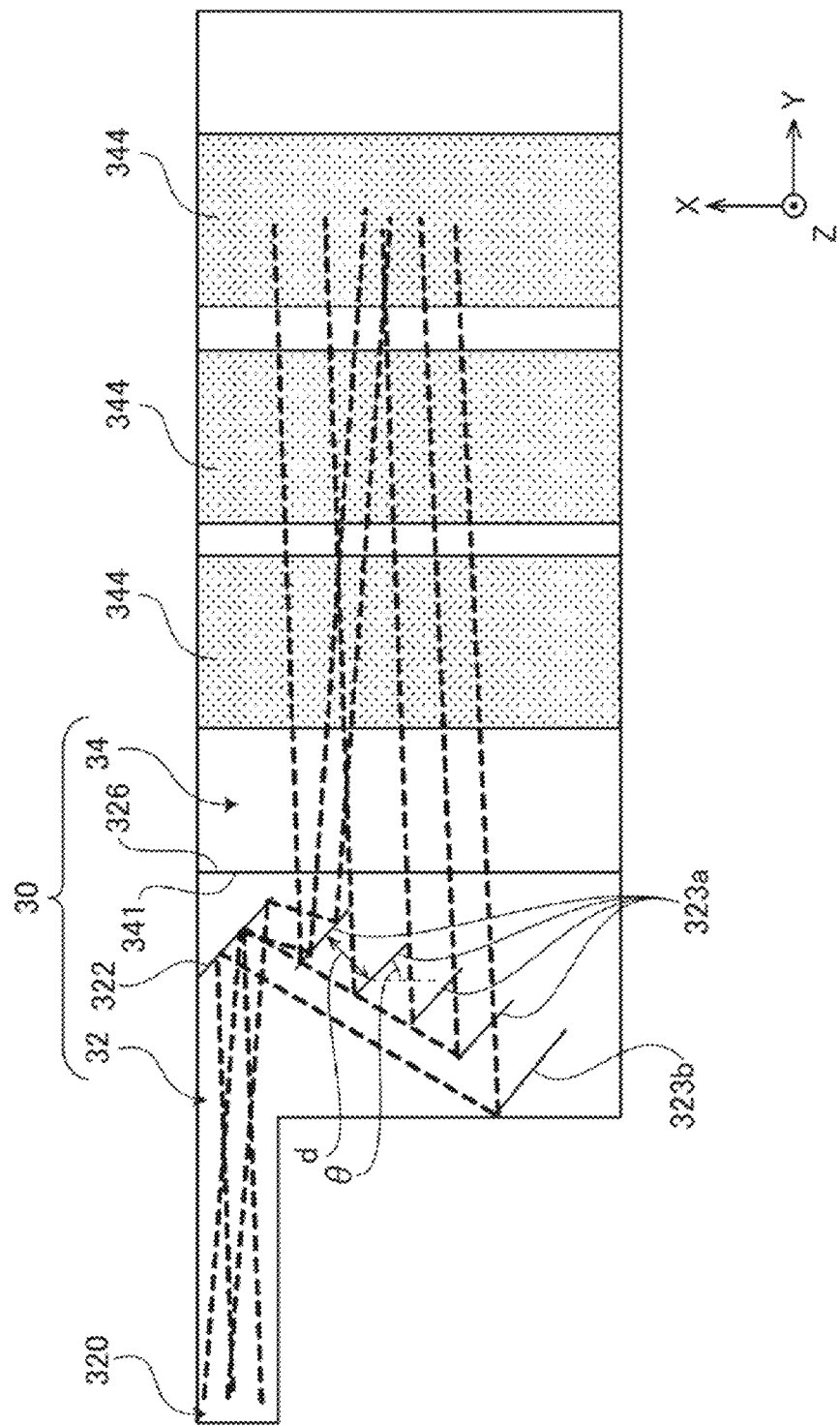

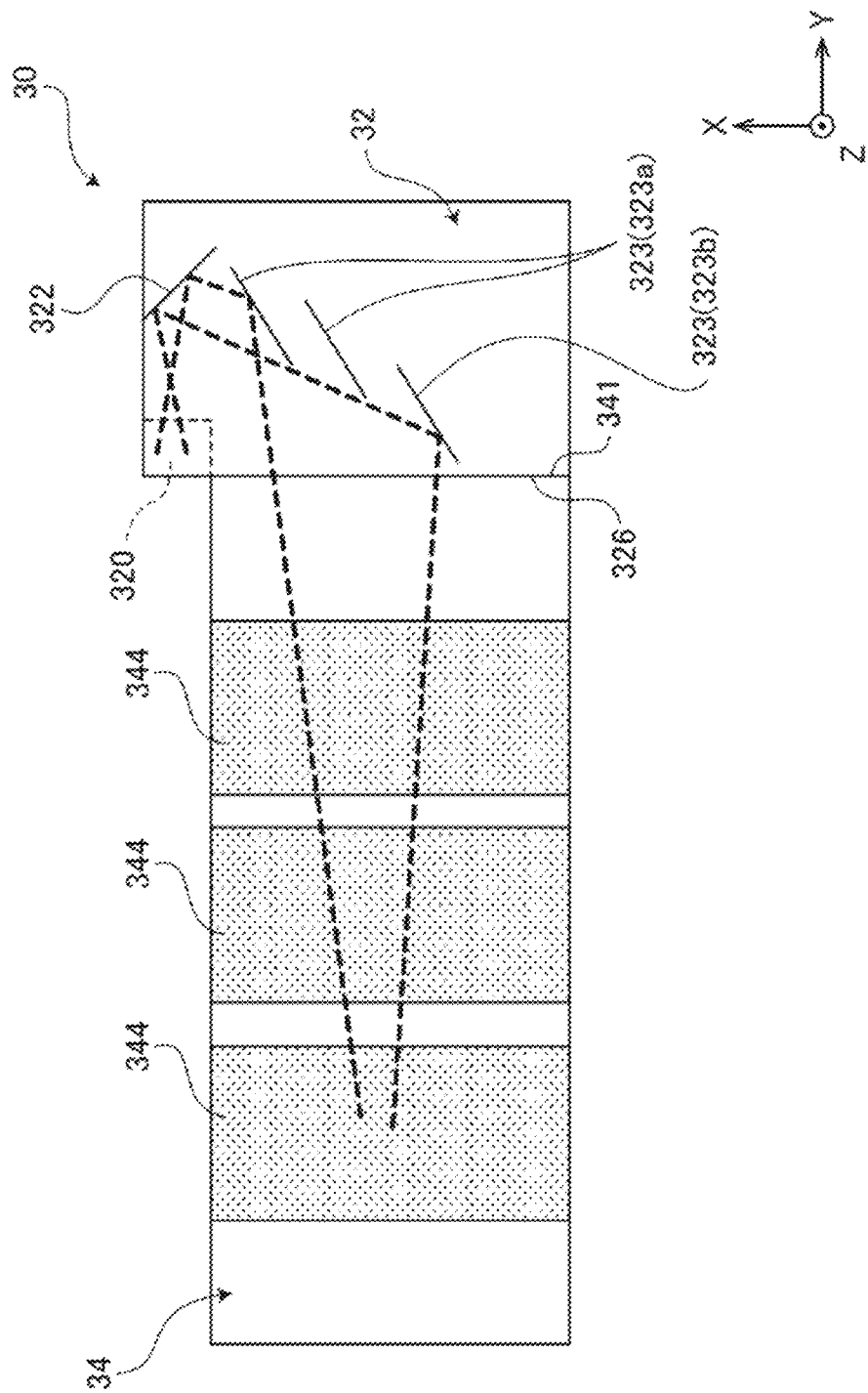

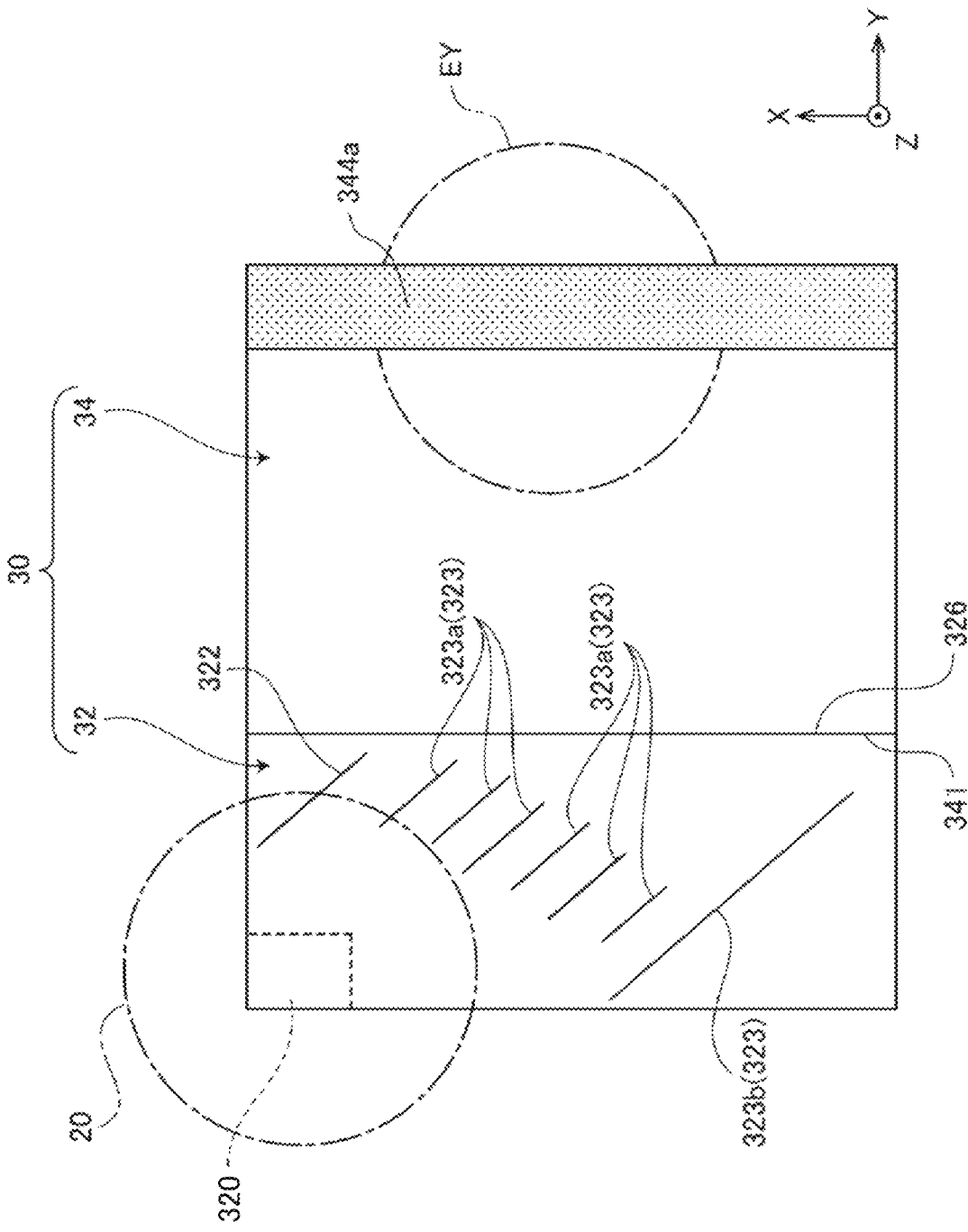

LIGHT GUIDE, OPTICAL UNIT, VIRTUAL IMAGE DISPLAY DEVICE, AND HEAD-MOUNTED DISPLAY

CROSS-REFERENCE TO RELATED APPLICATIONS

This patent application is based on and claims priority pursuant to 35 U.S.C. § 119(a) to Japanese Patent Application No. 2021-147830, filed on Sep. 10, 2021, in the Japan Patent Office, the entire disclosure of which is hereby incorporated by reference herein.

BACKGROUND

Technical Field

Embodiments of the present disclosure relate to a light guide, an optical unit, a virtual image display device, and a head-mounted display.

Related Art

Virtual image display devices have been developed to enlarge images displayed on image displays and display enlarged images for users' observation.

A virtual image display device, for example, allows light (i.e., image light, or light containing image information) from an image display element to enter a light guide and guides the light through the light guide, emitting the guided light containing image information toward an observer, or a user. This allows the observer to observer an enlarged virtual image formed with the emitted light.

The light guide includes multiple partial reflection layers, each to separate image light entered through the optical entrance, into reflected light and transmitted light. The image light is separated by the multiple partial reflection layers into multiple light fluxes having the different angles of view, which travel toward the eyes of the observer. The observer can observe a virtual image with a wide angle of view formed by light with a wide angle of view.

SUMMARY

An embodiment of the present disclosure provides a light guide including: a first light guide portion including: an optical entrance; and multiple reflecting surfaces including at least one first reflecting surface and at least one second reflecting surface, the multiple reflecting surfaces configured to separate a light flux entered through the optical entrance, into multiple light fluxes; and a second light guide portion including an optical exit, the second light guide portion configured to cause the multiple light fluxes to propagate therethrough and exit from the optical exit. The light guide is configured to allow a part of the light flux to strike and reflect off the at least one first reflecting surface and propagate into the second light guide portion. The light guide is configured to allow another part of the light flux to strike and reflect off the at least one second reflecting surface without striking the at least first reflecting surface, and propagate into the second light guide portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a diagram of a configuration of a light guide incorporated in a HMD as an example of a virtual image display device according to an embodiment of the present disclosure;

FIG. 4 is a diagram of a configuration of a light guide incorporated in a HMD, according to another embodiment of the present disclosure;

FIG. 5 is an illustration of a model of a light guide used in simulation according to a first embodiment;

Figure 1:
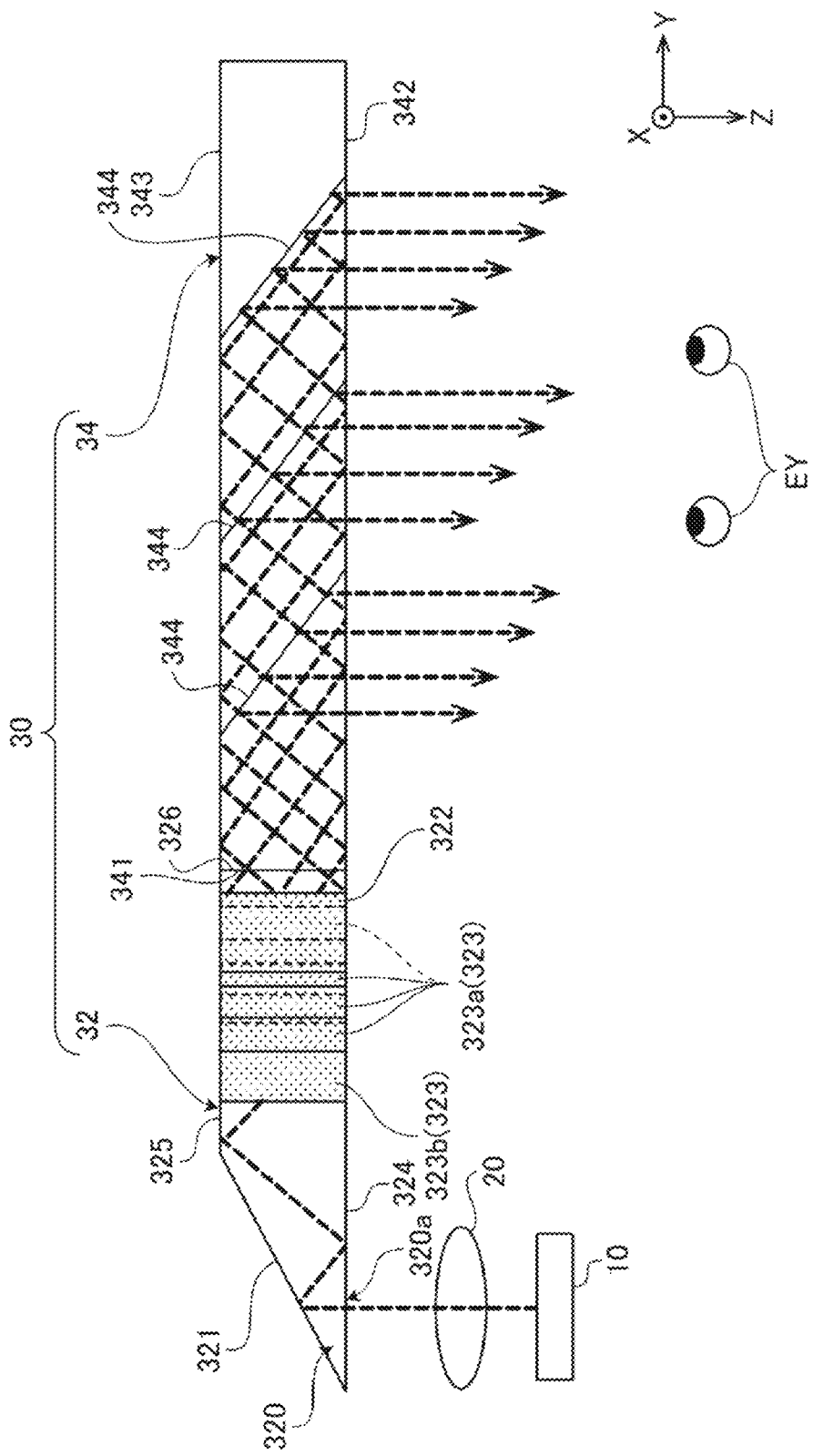
FIG. 1 is a diagram of the configuration of a head-mounted display (HMD) as an example of a virtual image display device according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

Embodiments of the present disclosure provides a higher light use efficiency in a light guide, an optical unit, a virtual image display device, and a head-mounted display (HMD).

Hereinafter, a light guide, an optical unit, a virtual image display device, and a head-mounted display according to an embodiment of the present disclosure will be described with reference to the drawings. In the following description, common or corresponding elements are denoted by the same or similar reference signs, and redundant description is appropriately simplified or omitted.

FIG. 1 is a diagram of the configuration of an HMD 1 as an example of a virtual image display device according to an embodiment of the present disclosure. As illustrated in FIG. 1, an HMD 1 includes an image display element 10 and an optical unit. The optical unit includes a propagation optical system 20 and a light guide 30. FIG. 1 indicates the eyes EY of a wearer (an observer) wearing the HMD 1.

The image display element 10 displays an image to be recognized as a virtual image. Examples of the image display element 10 include an organic light emitting diode (OLED) array, a laser diode (LD) array, a light emitting diode (LED) array, micro electro mechanical systems (MEMS), and a digital micromirror device (DMD).

Light (i.e., light containing image information, or image light) emitted from each pixel of the image display element 10 enters the propagation optical system 20. The propagation optical system 20 is an optical system that causes image light (light containing information on the image) from the image display element 10 serving as a light source to propagate forward and strike the optical entrance 320 of the light guide 30 as the image light as parallel light.

Causing the image light as parallel light to strike the optical entrance 320 by the propagation optical system 20 allows image light passed through the light guide 30 to form an image at one point on the retina of the eye of the wearer. This provides a virtual image with a higher quality.

The light guide 30 allows the image light from the propagation optical system 20 to propagate through the light guide 30 and exit the light guide 30 toward the eyes EY, thus allowing display of a virtual image. The wearer can observe an enlarged virtual image formed with the image light emitted from the light guide 30.

In the following description, a first horizontal direction in which the image display element 10, the propagation optical system 20, and the light guide 30 are arranged is defined as a Z-direction, a second horizontal direction orthogonal to the Z-direction is defined as a Y-direction, and a vertical direction orthogonal to each of the Y-direction and the Z-direction is defined as an X-direction. The X-direction, the Y-direction, and the Z-direction orthogonal to each other form a right-handed system. The term "direction" is used for convenience to describe the relative position between the components, and does not indicate an absolute direction. Depending on the angle of the HMD 1, for example, the Z-direction may not be the horizontal direction and may be the vertical direction.

FIG. 2 is a diagram of a configuration of the light guide 30. FIG. 1 is a side view of the light guide 30 as viewed in the +X-direction, and FIG. 2 is a side view of the light guide 30 as viewed from the eyes EY of the wearer in the +Z-direction.

As illustrated in FIGS. 1 and 2, the light guide 30 includes a first light guide portion 32 and a second light guide portion 34.

The first light guide portion 32 includes an optical entrance 320. The optical entrance 320 receives image light from the propagation optical system 20. As illustrated in FIG. 1, the image light, or an incident light flux, entering the light guide 30 through the optical entrance 320 reflects off a reflecting surface 321 and propagates in the +Y-direction.

The first light guide portion 32 includes therein a reflecting surface 322 (a third reflecting surface) and multiple reflecting surfaces 323 that separate the image light, or a light flux entered through the optical entrance 320 into multiple light fluxes. The reflecting surface 322 reflects the light flux reflected from the reflecting surface 321 after entering through the optical entrance 320, to the multiple reflecting surfaces 323 without transmitting the light flux.

The multiple reflecting surfaces 323 include at least one first reflecting surface 323a and at least one second reflecting surface 323b. In the example of FIGS. 1 and 2, four first reflecting surfaces 323a and one second reflecting surface 323b (five reflecting surfaces 323 in total) are used. In the examples of FIGS. 1 and 2, the number of the first reflecting surfaces 323a is greater than the number of the second reflecting surfaces 323b. This configuration is merely one example. In some examples, the number of the second reflecting surface 323b may be greater than the number of the first reflecting surfaces 323a. Notably, the first reflecting surface 323a and the second reflecting surface 323b are collectively referred to as reflecting surfaces 323 when not distinguished from each other for their description.

The reflecting surface 322 between the optical entrance 320 and the reflecting surfaces 323 in a direction of propagation of light allows a higher flexibility in the arrangement of the optical entrance 320 than a configuration without the reflecting surface 322. The downsizing of the light guide 30 depends, for example, on the arrangement of optical entrance 320.

The first light guide portion 32 includes a first surface 324 and a second surface 325 parallel to each other.

The first surface 324 and the second surface 325 are parallel to an XY plane extending in the X-direction and the Y-direction and orthogonal to each of the first reflecting surface 323a and the second reflecting surface 323b. The first reflecting surface 323a and the second reflecting surface 323b are disposed between the first surface 324 and the second surface 325.

The distance between the first surface 324 and the second surface 325 is equal to the width (a dimension in the Z-direction) of each of the first reflecting surfaces 323a and the second reflecting surface 323b. In other words, each of the first reflecting surfaces 323a and the second reflecting surface 323b extends over the entire first light guide portion 32 in the Z-direction.

With the first surface 324 parallel to the second surface 325, the light flux entered through the optical entrance 320 propagates forward while undergoing the total reflection on the pair of the first surface 324 and the second surface 325. This configuration facilitates designing of a thinner first light guide portion 32.

If another pair of planes, in addition to the pair of the first surface 324 and the second surface 325, is used to allow the light flux entered through the optical entrance 320 to propagate while undergoing the total reflection on each plane, processing to satisfy the parallelism and profile irregularity of each plane becomes difficult. The present embodiment allows propagation of the incident light flux undergoing the total reflection on one pair of planes alone and facilitates processing of each plane unlike the configuration using two pairs of planes for the total reflection of the incident light flux.

The first light guide portion 32 and the second light guide portion 34 are, for example, separate members (i.e., the first light guide portion 32 and the second light guide portion 34 are separate from each other). The light guide 30 is a single integrated unit formed by bonding together the first light guide portion 32 and the second light guide portion 34 separated from each other. The first light guide portion 32 includes an exit surface 326 that emits multiple light fluxes into which the light flux entered through the optical entrance 320 has been divided by the multiple reflecting surfaces 323. The second light guide portion 34 has an entrance surface 341 upon which the multiple light fluxes strike after exiting from the exit surface 326. The exit surface 326 and the entrance surface 341 are parallel to each other. Additionally, the first light guide portion 32 and the second light guide portion 34 are formed as a single integrated unit by bonding the exit surface 326 and the entrance surface 341 together.

The exit surface 326 and the entrance surface 341 parallel to each other reduces or prevents the occurrence of various aberrations due to each light flux from the first light guide portion 32 entering the second light guide portion 34. Further, the single integrated unit of the first light guide portion 32 and the second light guide portion 34 does not involve a high profile irregularity of the exit surface 326 and the entrance surface 341 unlike the configuration in which the first light guide portion 32 is apart from the second light guide portion 34.

such configuration facilitates the manufacturing process of the light guide 30.

The second light guide portion 34 has two surfaces parallel to each other. One surface of the second light guide portion 34 is a third surface 342 located on the same plane as the first surface 324. The other surface the second light guide portion 34 is a fourth surface 343 located on the same plane as the second surface 325. In the second light guide portion 34, each light flux entered through the entrance surface 341 propagates through the second light guide portion 34 while totally reflecting off each plane of the third surface 342 and the fourth surface 343.

The second light guide portion 34 includes therein multiple partial reflection surfaces 344 each to divide a corresponding light flux entered through the entrance surface 341, into reflected light rays and transmitted light rays. The multiple partial reflection surfaces 344 are arranged at certain intervals in the Y-direction. Each partial reflection surface 344 is oriented at a prescribed angle relative to the third surface 342. The partial reflection surface 344 is, for example, a semi-reflective mirror.

In the first light guide portion 32, the multiple reflecting surfaces 323 divide the light flux entered through the optical entrance 320 into multiple light fluxes for the angles of view in the vertical direction (i.e., the X-direction). The multiple light fluxes for the angles of view in the vertical direction, divided by the reflecting surfaces 323, each are further divided by the multiple partial reflection surfaces 344 into multiple light fluxes for the angles of view in the horizontal direction (i.e., the Y-direction). The light fluxes for the angles of view in the horizontal direction after divided by the respective partial reflection surfaces 344 are deflected in directions according to the angles at which the partial reflection surfaces 344 are arranged, thus exiting through the third surface 342 (or an optical exit). This allows the wearer to visually recognize a virtual image having wide angles of view in both the vertical direction and the horizontal direction.

In this configuration, the second light guide portion 34 uses two surfaces (the third surface 342 and the fourth surface 343) parallel to each other to guide and deflect the light fluxes entered from the first light guide portion 32, allowing the deflected light fluxes to exit through the optical exit (the third surface 342).

The light guide 30 in FIGS. 1 and 2 is manufactured by, for example, the following method.

The reflecting surface 321 is formed as a film on one surface of one optical block forming the first light guide portion 32. The reflecting surface 322 is formed as a film on a part of one surface of one optical block forming the first light guide portion 32. The first reflecting surface 323a is formed as a film at a part of one surface of each of four optical blocks forming the first light guide portion 32. The second reflecting surface 323b is formed as a film at a part of one surface of one optical block forming the first light guide portion 32. Each of the reflecting surfaces is composed of a deposited film formed by depositing a metal material, for example. To increase adhesion to the optical block, a primer layer may be formed on one surface of the optical block before forming the reflecting surface on the primer layer. Each optical block on which the reflecting surface is formed is bonded together with an adhesive to produce the light guide portion 32 having the reflecting surface 321 and including the reflecting surface 322 and the multiple reflecting surfaces 323 therein.

Each partial reflection surface 344 is formed as a film on one surface of a corresponding optical block of multiple optical blocks forming the second light guide portion 34. Each of the partial reflection surfaces 344 is composed of a deposited film formed by depositing a metal material, for example. Each optical block on which the partial reflection surface 344 is formed is bonded together with an adhesive to produce the second light guide portion 34 including the multiple partial reflection surfaces 344 therein.

The exit surface 326 of the first light guide portion 32 and the entrance surface 341 of the second light guide portion 34 are bonded together with an adhesive to produce the light guide 30.

Each optical block of the light guide 30 is a molding composed of synthetic resin such as plastic. The light guide 30 composed of such resin is lightweight. With a decrease in the weight of the light guide 30, the load on the nose of the wearer (the user) decreases. For this reason, the wearer can continue wearing the HMD 1 for a long time without getting fatigued.

Figure 3A:
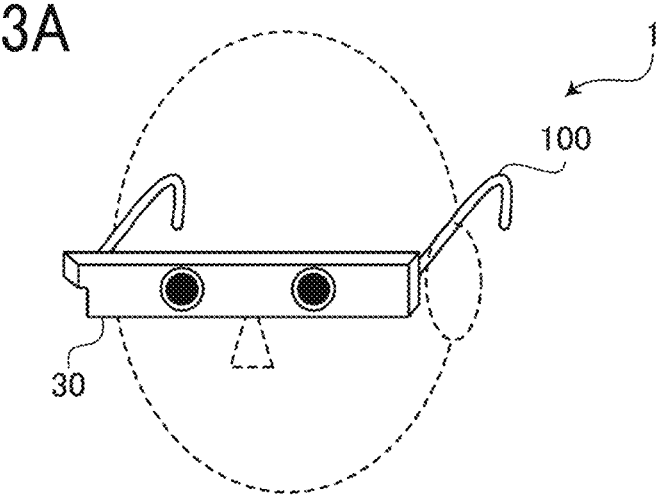
FIG. 3A is an illustration of a HMD a user is wearing, according to an embodiment of the present disclosure.
Figure 3B:
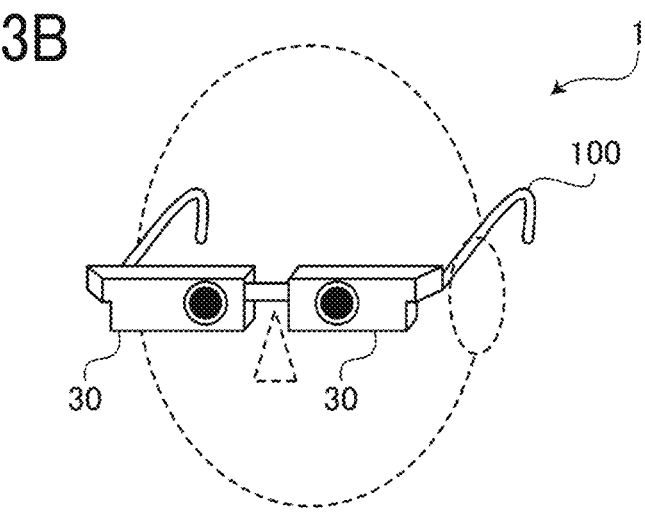
FIG. 3B is an illustration of a HMD a user is wearing, according to another embodiment of the present disclosure.
Figure 3C:
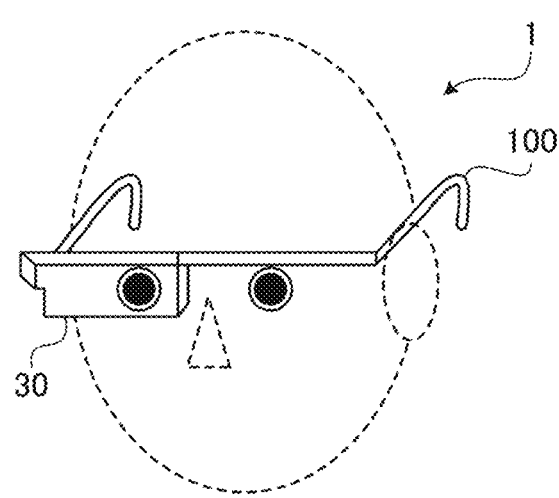
FIG. 3C is an illustration of a HMD a user is wearing, according to still another embodiment of the present disclosure.

FIGS. 3A to 3C are diagrams of the HMD 1 worn by the user. The HMD 1 illustrated in FIGS. 3A to 3C may be referred to as smart glasses.

The HMD 1 illustrated in FIG. 3A is a binocular head-mounted display, and has a configuration in which a single light guide 30 having a length corresponding to the width of the face of the user is fixed to a frame 100. The light guide 30 forms an eye box in a region including both the left and right eyes. The image display element 10 and the propagation optical system 20 are built in, for example, temples of the frame 100. Instead of the frame 100 being fixed to each end of the light guide 30, the frame 100 may cover the upper edge or the lower edge of the light guide 30.

The HMD 1 in FIG. 3B is also a binocular head-mounted display having a pair of head-mounted displays corresponding to the left eye and the right eye, each of which is fixed to the frame 100. The light guide 30 corresponding to the right eye forms an eye box in a region including the right eye. The light guide 30 corresponding to the left eye forms an eye box in a region including the left eye.

The HMD 1 in FIG. 3C is a monocular head-mounted display with a single head-mounted display corresponding to the right eye, which is fixed to the frame 100. In another example, the monocular head-mounted display may have a single head-mounted display corresponding to the left eye, which is fixed to the frame 100.

The propagation optical system 30 according to an embodiment is not limited to a HMD, and is applicable in other virtual image display devices. Another virtual image display device is, for example, a head-up display (HUD).

The first light guide portion 32 will be described in more detail.

In the first light guide portion 32, the light flux entered through the optical entrance 320 reflects off the reflecting surface 322 and travels toward the multiple reflecting surfaces 323. Since the reflecting surface 322 reflects the light flux entered through the optical entrance 320 without transmitting the light flux, substantially no light loss occurs at the reflecting surface 322.

A part of the light flux reflected by the reflecting surface 322 strikes and reflects off each of the first reflecting surfaces 323a, propagating into the second light guide portion 34. Another part of the light flux reflected by the reflecting surface 322 strikes and reflects off the second reflecting surface 323b without striking any one of the first reflecting surfaces 323a, thus propagating into the second light guide portion 34. In other words, the light flux reflected by the reflecting surface 322 strikes and reflects off the reflecting surfaces 323 so as to be divided into multiple light fluxes. Then, the divided light fluxes propagate to the second light guide portion 34.

In a light guide according to a comparative example, a partial reflection surface located farther from the optical entrance receives light containing information on an image (image light) that has struck and reflected off more partial reflection surfaces. Since the image light suffers losses each time it strikes and reflects off the partial reflection surface, the amount of light that does not reach the eyes of the wearer increases with an increasing number of partial reflection surfaces. Thus, with an increasing number of partial reflection surfaces that the image light strikes and reflects off, the light use efficiency of the light guide decreases.

However, the present embodiment allows a light flux entered through the optical entrance 320 to strike the second reflecting surface 323b away from the optical entrance 320 with substantially no light loss. Such a light flux reflects off the second reflecting surface 323b and propagates from the first light guide portion 32 to the second light guide portion 34, thus exiting from the light guide 30 toward the eyes EY of the wearer. The present embodiment involves less number of times of reflection (strike and reflection) of the image light at the reflecting surfaces 323 within the light guide 30 than the configuration according to a comparative example. Such less number of times of reflection at the reflecting surfaces 323 reduces light loss due to the reflection at the reflecting surface 323 and thus increases the light use efficiency of the light guide 30. This reduces variations in light intensity (light amount), or variations in luminance of a virtual image and thus achieves a higher visual recognizability of a virtual image.

The light use efficiency of the light guide 30 is defined by a ratio of the amount of image light (light exiting from the optical exit (the third surface 342) of the second light guide portion 34) with respect to the amount of image light (light entering the optical entrance 320 of the first light guide portion 32) (i.e., the amount of light exiting the light guide 30/the amount of light entering the light guide 30). In the present embodiment, the amount of light reaching the pupil of the eyes EY of the wearer is defined as the light exiting from the optical exit of the second light guide portion 34. A circle with a radius of 3 mm is assumed as the pupil of the eyes EY.

The variations in light intensity (light amount), or variations in luminance of a virtual image is given by equation below where a maximum value and a minimum value of the light intensity are within the range of an angle of view of a virtual image formed on the retina of the eyes EY when image light whose light intensity (light amount) for each angle of view is uniform enters the light guide 30.

Variations in light intensity=(maximum value of light intensity in angle-of-view range−minimum value of light intensity in angle-of-view range)/ (maximum value of light intensity in angle-of-view range)

The variations in light intensity are preferably 80% or less, and more preferably 40% or less. If the variations in light amount exceed 80%, the image appears to have chipping at a portion with a low light intensity. In addition, if the variations in light intensity become 40% or less, an image can be visually recognized without a sense of discomfort.

One first reflecting surface 323a of the multiple first reflecting surfaces 323a (four first reflecting surfaces 323a in the present embodiment) is placed closest to the optical entrance 320 on the optical path among the multiple reflecting surfaces 323. For convenience, the first reflection surface 323a placed closest to the optical entrance 320 on the optical path among the multiple reflecting surfaces 323 is referred to as a first reflecting surface 323a closest to the optical entrance.

The second reflecting surface 323b is disposed farther from the optical entrance 320 on the optical path than the first reflecting surface 323a

For the angles of view in the vertical direction (the X-direction), an upper angle of view of light reaching the eyes EY (i.e., an angle of view of light reaching the eyes EY from above) is defined as a positive angle, and a lower angle of view of the light (i.e., an angle of view of light reaching the eyes EY from below) is defined as a negative angle with reference to the YZ plane (the horizontal plane) passing through the center of the pupil of the eyes EY and extending in the Y-direction and the Z-direction.

Light having an angle of view in a range of +n° to −n° in the vertical direction reaches the eyes EY. More specifically, a light flux reflecting off the first reflecting surface 323a closest to the optical entrance turns light having an angle of view of +n° (i.e., a maximum angle of view) to reach the eyes EY located at the +X-side edge of the eye box in the X-direction, and a light flux reflecting off the second reflecting surface 323b turns light having an angle of view of −n° (i.e., a minimum angle of view) to reach the eyes EY at the −X-side edge of the eye box in the X-direction. The first reflecting surfaces 323a and the second reflecting surface 323b respectively reflect the light rays corresponding to the light rays with the angles of view in the range of +n° to −n° reaching the positions in the eye box of the eyes EY. In other words, the first reflecting surfaces 323a and the second reflecting surface 323b correspond to the positions in the eye box of the eyes EY at which the light rays reflected from the first reflecting surfaces 323a and the second reflecting surface 323b arrive. For the light rays reaching the +X-side end of the eye box of the eyes EY, light rays reach the eyes EY with an angle of view of +n° after reflecting off the first reflecting surface 323a closest to the optical entrance 320, and light rays reach the eyes EY with an angle of view of −n° after reflecting off another first reflecting surface 323a (e.g., the third first reflecting surface 323a in the −X-direction from the first reflecting surface 323a closest to the optical entrance) offset in the −X-direction from the first reflecting surface 323a closest to the optical entrance. Similarly, for the light rays reaching the −X-side end of the eye box of the eyes EY, light rays reach the eyes EY with an angle of view of −n° after reflecting off the second reflecting surface 323b, and light rays reach the eyes EY with an angle of view of +n° after reflecting off a first reflecting surface 323a (e.g., the third first reflecting surface 323a in the +X-direction from the second reflecting surface 323b) offset in the +X-direction from the second reflecting surface 323b. The light rays (light flux) reflecting off another first reflecting surface 323a other than the first reflecting surface 323a closest to the optical entrance 320 reaches the eyes EY with an angle of view between the maximum angle of view and the minimum angle of view. The light flux reflecting off the reflecting surface 323 at an increasing angle reaches the eyes EY with an increasing angle of view. More specifically, the reflection angle, at which light rays reflect off a reflecting surface 323, increases with the reflecting surface 323 closer to the first reflecting surface 323a closest to the optical entrance, and the reflection angle decreases with the reflecting surface 323 closer to the second reflecting surface 323b.

The present embodiment allows a light flux that has undergone substantially no light loss to strike the second reflecting surface 323b away from the optical entrance 320. This enables the light rays reaching the −X-side end of the eye box of the eyes EY with a minimum angle of view to have a light intensity sufficient to achieve the intended performance unlike the comparative example in which the light rays reaching the −X-side end of the eye box have suffered a great amount of light loss. This allows a higher light use efficiency of the light guide 30 and also reduces the variations in light intensity between the angles of view or the positions in the eye box, thus achieving a higher visibility of a virtual image.

The light guide 30 satisfies conditional expression (1) below where LV is the total light intensity (the total amount of light) of the light fluxes with the respective angles of view exiting from the second light guide portion 34 after vertically striking an entrance surface 320a of optical entrance 320 and reflecting off the respective reflecting surfaces 323; and LV1 is the light intensity (the amount of light) of a light flux with a maximum angle of view exiting from the second light guide portion 34 after striking the entrance surface 320a at an incident angle of 90 degrees and reflecting off the first reflecting surface 323a closest to the optical entrance 320 along the optical path among the multiple reflecting surfaces 323:

$$0.001 < LV1/LV < 0.5 \quad (1)$$

Satisfying conditional expression (1) allows a much higher light use efficiency of the light guide 30 and also reduces the variations in light intensity between the angles of view. If LV1/LV is 0.5 or more, the light intensity of the light rays exiting from the second light guide portion 34 after reflecting off the reflecting surfaces 323 except the first reflecting surface 323a closest to the optical entrance 320 excessively decreases, causing a lower light use efficiency of the light guide 30 and the variations in light intensity. If LV1/LV is 0.001 or less, the light intensity of light rays with a maximum angle of view exiting from the second light guide portion 34 excessively decreases with respect to the light rays with the other angles of view, causing a lower light use efficiency of the light guide 30 and variations in light intensity.

At least one of the multiple first reflecting surfaces 323a (in the present embodiment, all of the multiple first reflecting surfaces 323a) is a partial reflection surface (e.g., a semi-reflective mirror) transmits a part of light incident on the first reflecting surface 323a (a corresponding reflecting surface 323a). At least two of the multiple reflecting surfaces 323 each have different dimensions.

When one reflecting surface 323 has larger dimensions than the other reflecting surfaces 323, the area to reflect light by the one reflecting surface 323 increases (i.e., the one reflecting surface 323 reflects an increased amount of light, or light with increased light intensity), and the light intensity of light (the amount of light) with an angle of view in the vertical direction (the X-direction), which corresponds to the reflected light, (e.g., light with an angle of view of +n° after reflecting off the first reflecting surface 323a closest to the optical entrance) increases with respect to the light intensity of the light rays with the other angles of view in the vertical direction. However, when one reflecting surface 323 has larger dimensions than the other reflecting surfaces 323, the light rays corresponding to the light rays with the other angles of view adversely strike the one reflecting surface 323 before striking or after reflecting off the other reflecting surfaces 323, respectively, thus possibly suffering attenuation. For this reason, increasing the dimensions of the reflecting surface 323 does not lead to an increase in the light intensity of light with an angle of view in the vertical direction, which corresponds to the light reflecting off the reflecting surface 323.

In consideration of the above, each of the multiple reflecting surfaces 323 is configured to have an appropriate area (dimensions) that accommodates an increase in the vertical-directional angle of view of light in the horizontal direction (i.e., the horizontal-directional angle of view of light is increased sufficiently to cover the width of the eye box, which is assumed to be the width of the pupils of the eyes EY), the light corresponding to light reflecting off a corresponding reflecting surface 323, so as to achieve a desired luminance.

Such a configuration in which the area of each reflecting surface 323 is set according to the angle of view in the vertical direction of light corresponding to light reflecting off a corresponding reflecting surface 323 allows each of at least two reflecting surfaces 323 to have a different area. This allows a higher light use efficiency of the light guide 30 and reduces the variations in light intensity between the angles of view. Further, reducing the area of each of the first reflecting surfaces 323a as much as possible allows downsizing of the light guide 30.

The multiple reflecting surfaces 323 are arranged parallel to each other.

Arranging the multiple reflecting surfaces 323 parallel to each other allows light rays with each angle of view exiting from the second light guide portion 34 after reflecting off a corresponding reflecting surface 323 to form an image at one point on the retina of the eyes EY, thus achieving a virtual image with a higher quality.

The light guide 30 satisfies conditional expression (2) where d is an interval between the multiple reflecting surfaces 323 (i.e., the length of a line segment orthogonal to adjacent reflecting surfaces 323, the line segment between an intersection point (the beginning point) of the line segment and one reflecting surface 323 and an intersection point (the endpoint) of the line segment and the other reflecting surface 323):

$$0.5 \text{ mm} < d < 4 \text{ mm} \quad (2)$$

Satisfying conditional expression (2) allows a higher light use efficiency of the light guide 30 and enables two light fluxes with two angles of view exiting from the second light guide portion 34 after reflecting off adjacent reflecting surfaces 323 to overlap, reaching the pupil of the eyes EY. This allows a reduction in the variations in light intensity between the angles of view. If the interval d between the multiple reflecting surfaces 323 is 4 mm or greater, the two light fluxes with two angles of view fail to overlap and reaches the pupil of the eyes EY while separating from each other in the vertical direction (the X-direction). Such a failure to overlap the light fluxes with the angles of view adversely increases the variations in light intensity between the angles of view and also causes more amount of light rays to fail to reach the pupil of the eyes EY, thus degrading the light use efficiency of the light guide 30.

If the interval d between the multiple reflecting surfaces 323 is 0.5 mm or less, an overlap between the two light rays with two angles of view increases, which increases the variations in light intensity between the angles of view and causes more amount of light to fail to reach the pupil of the eyes EY. Thus, the light use efficiency of the light guide 30 degrades.

Satisfying conditional expression (2)' allows a much higher light use efficiency of the light guide 30 and also reduces the variations in light intensity between the angles of view.

$$1 \text{ mm} < d < 3 \text{ mm} \tag{2}'$$

As described above, the light guide 30 allows the wearer to visually recognize the image light emitted from the optical exit (the third surface 342) as a virtual image. The light guide 30 satisfies conditional expression (3) where θ is an angle between each of the multiple reflecting surfaces 323 and a direction (the X-direction) orthogonal to a direction in which a virtual image is emitted from the optical exit of the light guide 30, the direction being coincident with a first-side direction of the image display element 10 (i.e., a direction in which a first side of the image display element 10 extends; in the present embodiment, a direction in which the short side of the image display element 10 extends (i.e., the short-side direction)):

$$30° < θ < 60°$$

Changing the angle θ changes the area (dimensions) and arrangement of each of the reflecting surfaces 323 that achieve advantageous effects: a higher light use efficiency of the light guide 30 and a reduction in the variations in light intensity between the angles of view.

If the angle θ is 60° or more, each reflecting surface 323 is offset from a desired position to achieve the above-described advantageous effects to be too close to the second light guide portion 34, which might cause each reflecting surface 323 to enter the field of view, for example.

When the HMD 1 is a see-through head-mounted display, the visibility of the outside may degrade. In addition, since each reflecting surface 323 has too large an area to achieve the above-described advantageous effects, light rays for each angle of view adversely strike more reflecting surfaces 323 in the first light guide portion 32 and thus more likely suffer attenuation. Thus, the light use efficiency of the light guide 30 degrades, and the variations in light intensity between the angles of view increases.

If the angle θ is 30° or less, each reflecting surface 323 has too small an area to achieve the above-described advantageous effects. To achieve a wider angle of view, more reflecting surfaces 323 are arranged in the first light guide portion 32. This causes upsizing of the light guide 30. Thus, a glasses wearable device is difficult to form in its shape. The increase in the number of reflecting surfaces 323 causes the light rays for each angle of view to strike more reflecting surfaces 323 in the first light guide portion 32, thus more likely suffering attenuation. Thus, the light use efficiency of the light guide 30 degrades, and the variations in light intensity between the angles of view increases.

To avoid such circumstances, the light guide 30 is configured to satisfy conditional expression (3). Satisfying conditional expression (3) allows the visibility of the outside and downsizing of the light guide 30 and also achieves a higher light use efficiency of the light guide 30 and a reduction in the variations in light intensity between the angles of view.

The light guide 30 satisfies conditional expression (4) where N is the number of reflecting surfaces 323:

$$4 \leq N \leq 14 \tag{4}$$

Satisfying conditional expression (4) allows a higher light use efficiency of the light guide 30 and also reduces the variations in light intensity between the angles of view. If N (the number of reflecting surfaces 323) is 15 or more, an overlap between the two light flues with two angles of view exiting from the second light guide portion 34 after reflecting off adjacent two reflecting surfaces 323 increases, which increases the variations in light intensity between the angles of view and causes more amount of light to fail to reach the pupil of the eyes EY. Thus, the light use efficiency of the light guide 30 degrades. Further, the interval d between the multiple reflecting surfaces 323 becomes narrow, and the accuracy of arrangement increases. Thus, processing becomes difficult. If N (the number of reflecting surfaces 323) is 3 or less, the two light fluxes with two angles of view exiting from the second light guide portion 34 fail to overlap and reaches the pupil of the eyes EY while separating from each other in the vertical direction (the X-direction). Such a failure to overlap the light fluxes with the angles of view adversely increases the variations in light intensity between the angles of view and also causes more amount of light rays to fail to reach the pupil of the eyes EY, thus degrading the light use efficiency of the light guide 30.

Satisfying conditional expression (4)' allows a much higher light use efficiency of the light guide 30 and also reduces the variations in light intensity between the angles of view.

$$6 \leq N \leq 10 \tag{4}'$$

The light guide 30 satisfies conditional expression (5) where R1 is a reflectance of the first reflecting surface 323a closest to the optical entrance 320 along the optical path among the multiple reflecting surfaces 323 when an angle at which a part of a light flux entered through the optical entrance 320 strikes the first reflecting surface 323a closest to the optical entrance 320 is 45°:

$$5\% < R1 < 40\% \tag{5}$$

Satisfying conditional expression (5) further reduces the variations in light intensity between the angles of view. If the reflectance R1 is 40% or greater, a sufficient amount of light fails to strike the other reflecting surfaces 323 away from the optical entrance 320 other than the first reflecting surface 323a closest to the optical entrance 320, thus resulting in failure to reduce the variations in light intensity. If the reflectance R1 is 5% or less, the amount (light intensity) of light with the angle of view exiting from the second light guide portion 34 after reflecting off the first reflecting surface 323*a* closest to the optical entrance 320 decreases, thus resulting in failure to increase the light use efficiency of the light guide 30.

The multiple first reflecting surfaces 323*a* include a first partial reflection surface and a second partial reflection surface farther from the optical entrance 320 along the optical path than the first partial reflection surface (e.g., the first reflecting surface 323*a* closest to the optical entrance 320 and a reflecting surface 323 farther from the optical entrance 320 along the optical path than the first reflecting surface 323*a* closest to the optical entrance 320 is). The reflectance is higher for the second partial reflection surface on which a part of the light flux entered through the optical entrance 320 has struck at an angle of 45° than for the first partial reflection surface on which another part of the light flux has struck at an angle of 45°.

More specifically, in the light guide 30, a first reflecting surface 323*a* farther from the optical entrance 320 has a higher reflectance in response to light striking the first reflecting surface at an angle of 45°.

A first reflecting surface 323*a* farther from the optical entrance 320 along the optical path suffers a greater attenuation of light because the light flux entered through the optical entrance 320 strikes another or other first reflecting surfaces 323*a*. Thus, such a first reflecting surface 323*a* farther from the optical entrance receives less amount of light. If the multiple first reflecting surfaces 323*a* all have the same reflectance, light rays exiting from the second light guide portion 34 after reflecting off a first reflecting surface 323*a* farther from the optical entrance 320 along the optical path have undergone more attenuation and more likely cause the variations in light intensity. To avoid such a situation, the reflectance of the first reflecting surface 323*a* is set as described above to reduce or prevent differences in light intensity between the angles of view and thus reduces the variations in light intensity between the angles of view.

The second reflecting surface 323*b* may be a partial reflection surface similar to the first reflecting surface 323*a*. However, more preferably, the second reflecting surface 323*b* may be a reflecting surface that does not transmit incident light.

More specifically, if the second reflecting surface 323*b* farther from the optical entrance 320 along the optical path than the first reflecting surface 323*a* is composed of a partial reflection surface, light transmitted through the second reflecting surface 323*b* turns stray light, causing more light to fail to reach the pupil of the eyes EY. This results in a lower light use efficiency of the light guide 30.

To avoid such a situation, the second reflecting surface 323*b* is preferably a reflection surface that does not transmit light incident on the second reflecting surface 323*b*, instead of being a partial reflection surface. Eliminating light transmitted through through the second reflecting surface 323*b* can prevent the occurrence of such stray light and thus allows a higher light use efficiency of the light guide 30.

FIG. 4 is an illustration of a configuration of a light guide 30 according to another embodiment. In the embodiment described above, each reflecting surface 323 is oriented in a direction to reflect a light flux incident therein in the +Y-direction. In another embodiment, each reflecting surface 323 is oriented in a direction to reflect a light flux incident therein in the −Y-direction. In this configuration, the second light guide portion 34 is adjacent to the −Y-side of the first light guide portion 32. With a change in the orientation of the reflecting surface 323, the position of the second light guide portion 34 with respect to the first light guide portion 32 can be changed. In other words, there is a flexibility in the form of the light guide 30, and various design changes are possible.

First to sixth embodiments of the HMD 1 are described below. The first embodiment to the sixth embodiment present simulation results obtained using the optical simulation software. Common matters of the first embodiment to the sixth embodiment are as follows. In the first embodiment to the sixth embodiment, the refractive index indicates a refractive index with respect to the d-line (a wavelength of 587.56 nm).

Common Matters of First Embodiment to Sixth Embodiment

Image Display Element 10
 Angle of view in the vertical direction (X direction):
  20°
 Effective pixel region (display region that emits image light):
  0.01 mm (in the short-side direction (the X-direction))× 0.76 mm (in long-side direction (the Y-direction))
Propagation Optical System 20 (Set as an Ideal Lens in Simulation)
 Focal length:
  2.13 mm
 Distance between the optical entrance 320 and the last lens surface (the lens surface closest to the optical entrance 320 among the lens surfaces included in the propagation optical system 20):
  1.3 mm
 Diameter of the light flux emitted from the propagation optical system 20:
  4 mm
 (In the Fourth Embodiment to the Sixth Embodiment, the Diameter is 3.3 mm, 2 mm, and 5 mm, Respectively)
 Refractive index:
  1.533 (material: Zeonex (registered trademark) E48R)
Light Guide 30
 Refractive index of the first light guide portion 32 and the second light guide portion 34:
  1.533 (material: Zeonex (registered trademark) E48R)
 Refractive index of adhesive for bonding the first light guide portion 32 and the second light guide portion 34:
  1.533
Eye Box
 6 mm or greater in the vertical direction (X-direction)
Eye Relief
 15 mm or greater
Eyes EY (Set as an Ideal Lens in Simulation)
 Focal length:
  12 mm
 Lens radius (pupil radius):
  3 mm In the first to sixth embodiments, the reflecting surface 323 closer to the optical entrance 320 along the optical path is associated with a smaller natural number n. For example, in the first embodiment, the first light guide portion 32 includes seven reflecting surfaces 323 therein. In the first to sixth embodiments, the reflectances of the reflecting surfaces 323 are listed as R1, R2, R3, R4, R5, R6, and R7 in order from a reflecting surface closest to the optical entrance 320 along the optical path. Further, the interval d between adjacent two reflecting surfaces 323 is represented by (n, n+1). As an example, the interval d between the first reflecting surface 323*a* closest to optical entrance 320 along the optical path and a reflecting surface 323a second closest to optical entrance 320 along the optical path is represented by an interval d (1, 2).

In the first to sixth embodiments, the reflecting surface 323 farthest from optical entrance 320 along the optical path among the multiple reflecting surfaces 323 within the first light guide portion 32 is the second reflecting surface 323b, and the other reflecting surfaces 323 are first reflecting surfaces 323a.

FIRST EMBODIMENT

FIG. 5 is an illustration of a model of a light guide 30 used in simulation according to the first embodiment.

Figure 6:
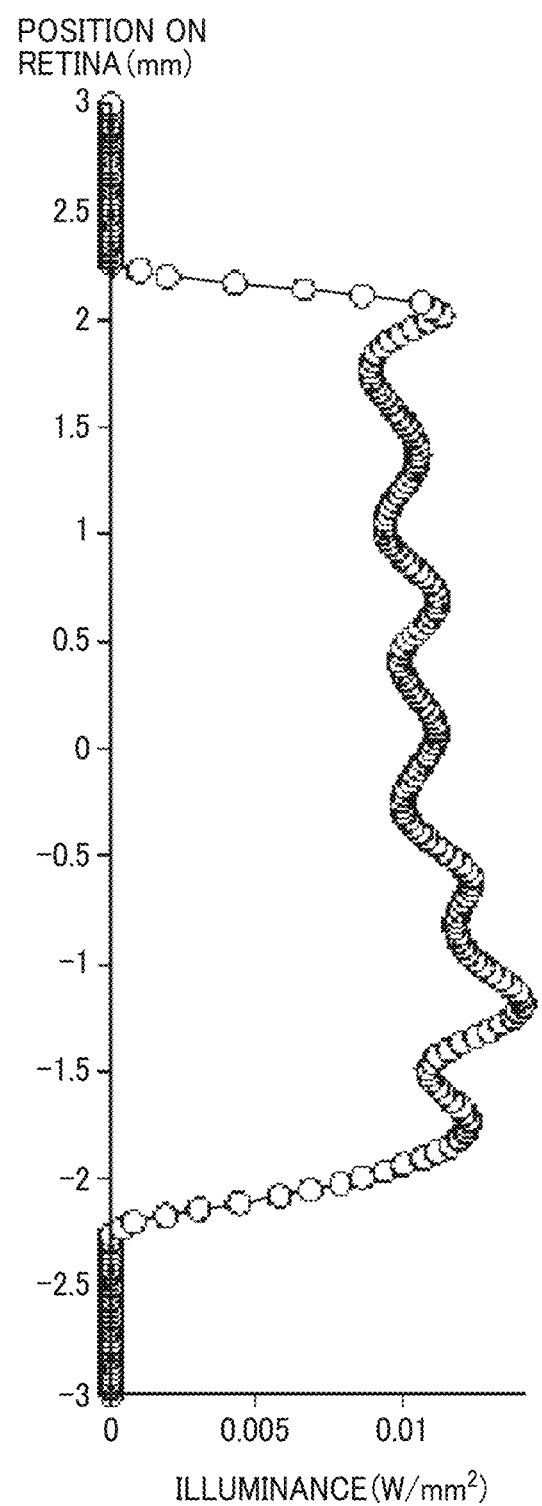
FIG. 6 is a graph of the variations in light intensity first embodiment.

FIG. 6 is a graph of the variations in light intensity, i.e., the relation between the position of a virtual image on the retina of the eyes EY and the illuminance, calculated by simulation according to the first embodiment. The vertical axis represents the position (mm) in the vertical direction (X-direction) on the retinas, and the horizontal axis represents the illumination (W/mm$^2$). FIG. 6 is a graph for light reaching the retina after reflecting off a partial reflection surface 344a (see FIG. 5) placed forward of the center of the pupil of the eyes EY and exiting from the optical exit (the third surface 342).

Typical head-mounted displays have a light use efficiency of less than 10%.

However, the light guide 30 according to the first embodiment has a light use efficiency of 18%, which means that the first embodiment achieves a high light use efficiency. As presented in FIG. 6, the variations in light intensity are reduced to 30%. With such a light guide, the wearer can observe a virtual image without a sense of discomfort.

A specific numerical configuration of the HMD 1 according to the first embodiment is as follows. As listed below, the first embodiment satisfies all of the conditional expressions (1) to (5). The first embodiment satisfying conditional expressions (1) to (5) exhibit all the advantageous effects as described above.

First Light Guide Portion 32
  Thickness (dimension in the Z-direction)
  2.5 mm
  Length (dimension in the Y-direction)
  37 mm
  Width (dimension in the X-direction)
  15 mm
  Angle between the entrance surface 320a of the optical entrance 320 and the reflecting surface 321
  26.5°
  Angle between the vertical direction (the X-direction) and the reflecting surface 322
  40°
Reflecting Surface 323
The Number of Reflecting Surfaces 323
  7 (all the reflecting surfaces 323 are partial reflection surfaces)
  Angle θ
  40°
Reflectance for an Incident Angle of 45°
  R1: 14.3%
  R2: 16.7%
  R3: 15%
  R4: 23%
  R5: 25%
  R6: 25%
  R7: 32%
  LV1/LV
  0.12
Interval d between Reflecting Surfaces 323
  d (1, 2): 2.5 mm
  d (2, 3): 2.45 mm
  d (3, 4): 2.55 mm
  d (4, 5): 2.72 mm
  d (5, 6): 2.87 mm
  d (6, 7): 2.9 mm
Second Light Guide Portion 34
  Thickness (dimension in the Z-direction)
  2.5 mm
  Length (dimension in the Y-direction)
  37 mm
  Width (dimension in the X-direction)
  27 mm
  Angle between the optical entrance (the third surface 342) and the partial reflection surface 344
  26.5°

Second Embodiment

Figure 7:
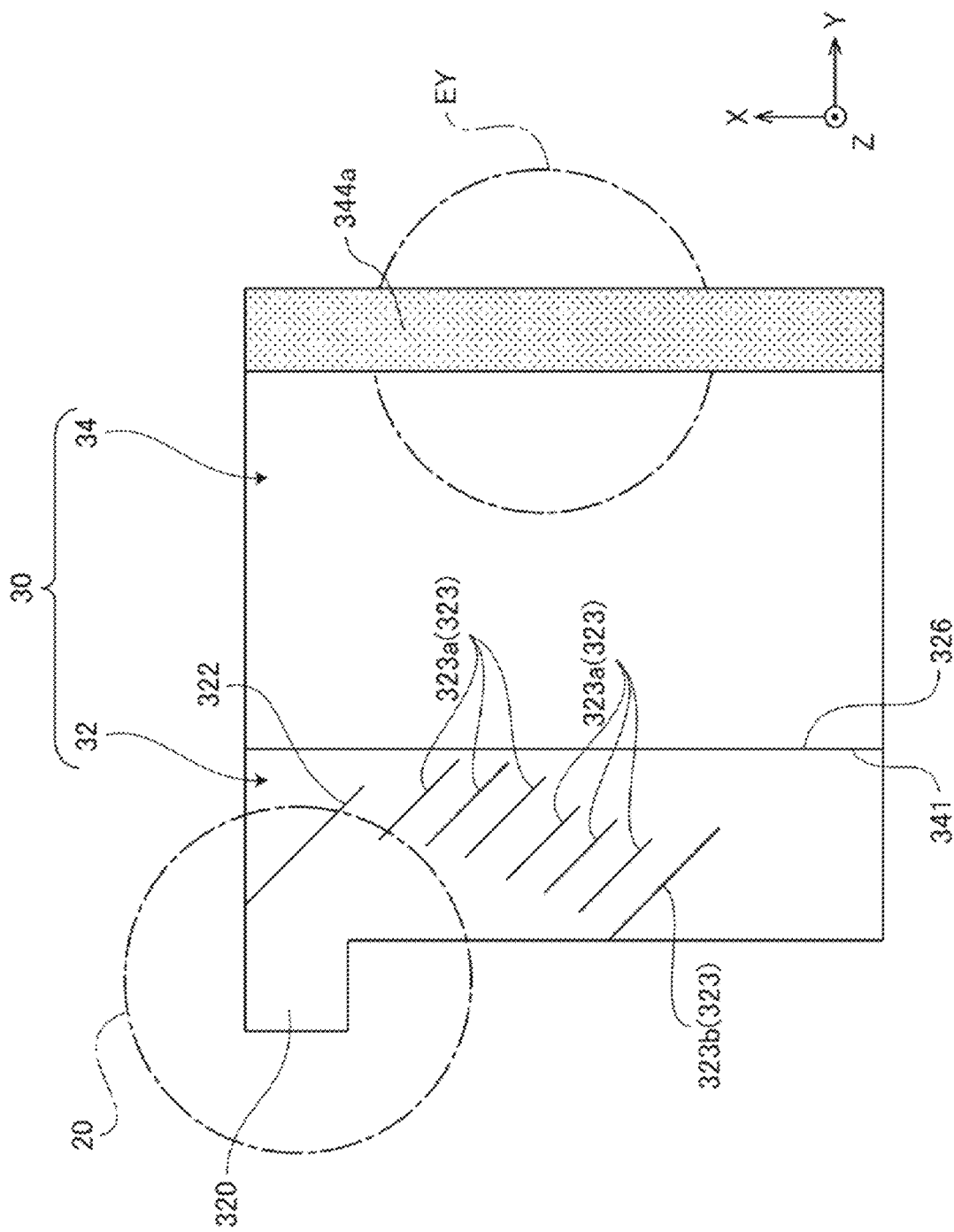
FIG. 7 is an illustration of a model of a light guide used in simulation according to a second embodiment.
Figure 8:
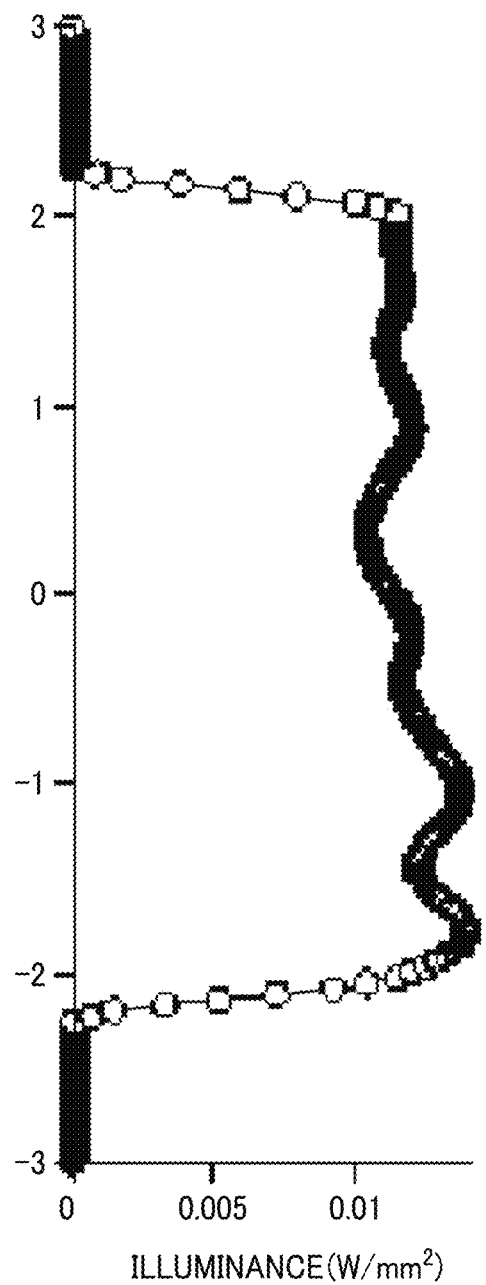
FIG. 8 is a graph of the variations in light intensity according to the second embodiment.

FIGS. 7 and 8 are similar to FIGS. 5 and 6, respectively. FIG. 7 is an illustration of a model of a light guide 30 used in simulation according to the second embodiment. FIG. 8 is a graph of the variations in light intensity, i.e., the relation between the position of a virtual image on the retina of the eyes EY and the illuminance, calculated by simulation according to the second embodiment.

However, the light guide 30 according to the second embodiment has a light use efficiency of 33%, which means that the second embodiment achieves a high light use efficiency. As presented in FIG. 8, the variations in light intensity are reduced to 20%. With such a light guide, the wearer can observe a virtual image without a sense of discomfort.

A specific numerical configuration of the HMD 1 according to the second embodiment is as follows. As listed below, the second embodiment satisfies all of the conditional expressions (1) to (5). The second embodiment satisfying conditional expressions (1) to (5) exhibit all the advantageous effects as described above.

First Light Guide Portion 32
  Thickness (dimension in the Z-direction)
  2.5 mm
  Length (dimension in the Y-direction)
  37 mm
  Width (dimension in the X-direction)
  13 mm
  Angle between the entrance surface 320a of the optical entrance 320 and the reflecting surface 321
  26.5°
  Angle between the vertical direction (the X-direction) and the reflecting surface 322
  45°
Reflecting surface 323
The Number of Reflecting Surfaces 323
  7 sheets (6 of 7 sheets are partial reflection surfaces)
  Angle θ
  45°
Reflectance for an Incident Angle of 45°
  R1: 20%
  R2: 30%
  R3: 40%
  R4: 50%
  R5: 60%
  R6: 70%

R7: 100% (reflecting surface which is not a partial reflection surface)
LV1/LV
0.14
Interval d between Reflecting Surfaces 323
  d (1, 2): 2.15 mm
  d (2, 3): 2.2 mm
  d (3, 4): 2.55 mm
  d (4, 5): 2.17 mm
  d (5, 6): 2.1 mm
  d (6, 7): 2.95 mm
Second Light Guide Portion 34
  Thickness (dimension in the Z-direction)
  2.5 mm
  Length (dimension in the Y-direction)
  37 mm
  Width (dimension in the X-direction)
  27 mm
  Angle between the optical entrance (the third surface 342) and the partial reflection surface 344
  26.5°

Third Embodiment

Figure 9:
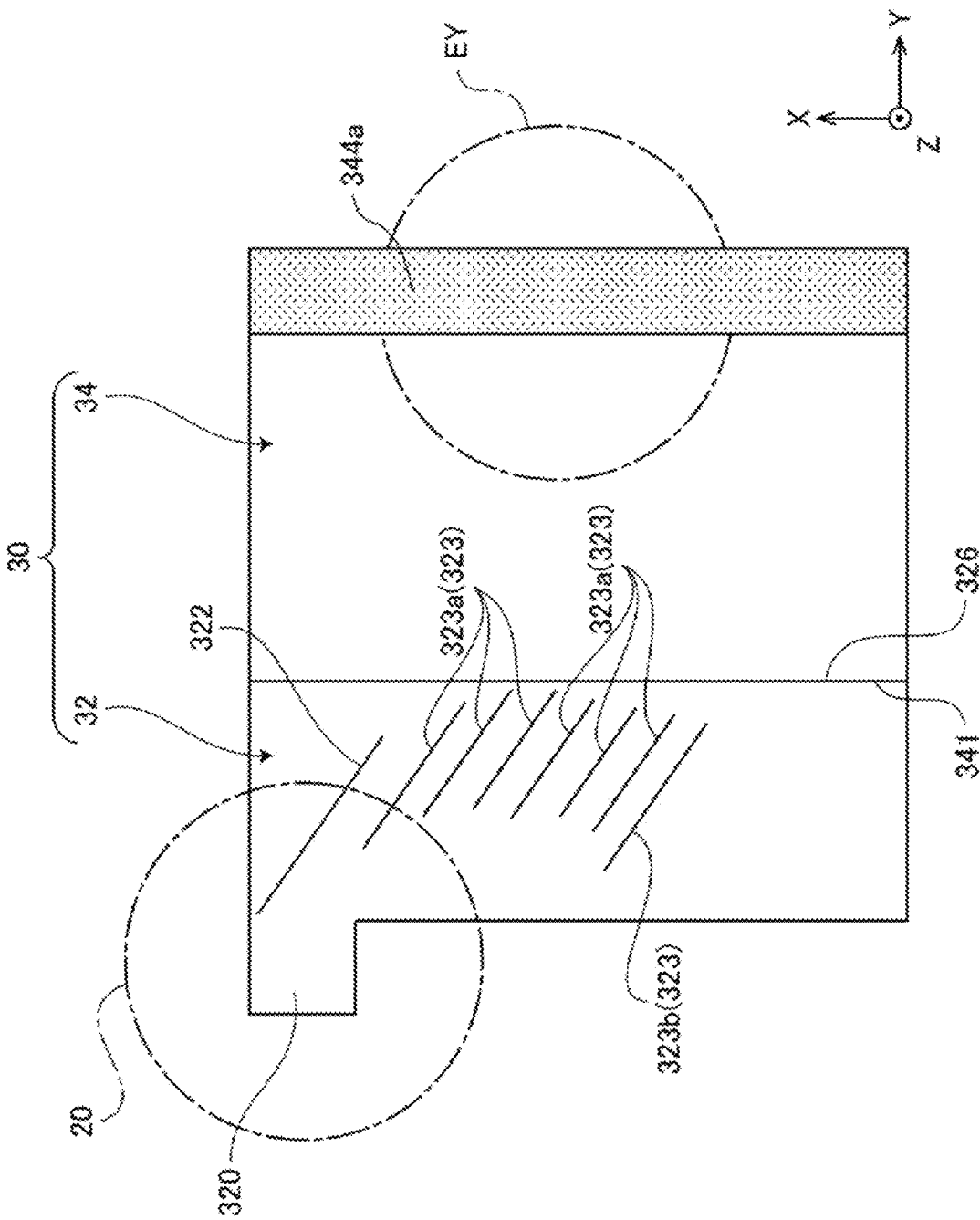
FIG. 9 is an illustration of a model of a light guide used in simulation according to a third embodiment.
Figure 10:
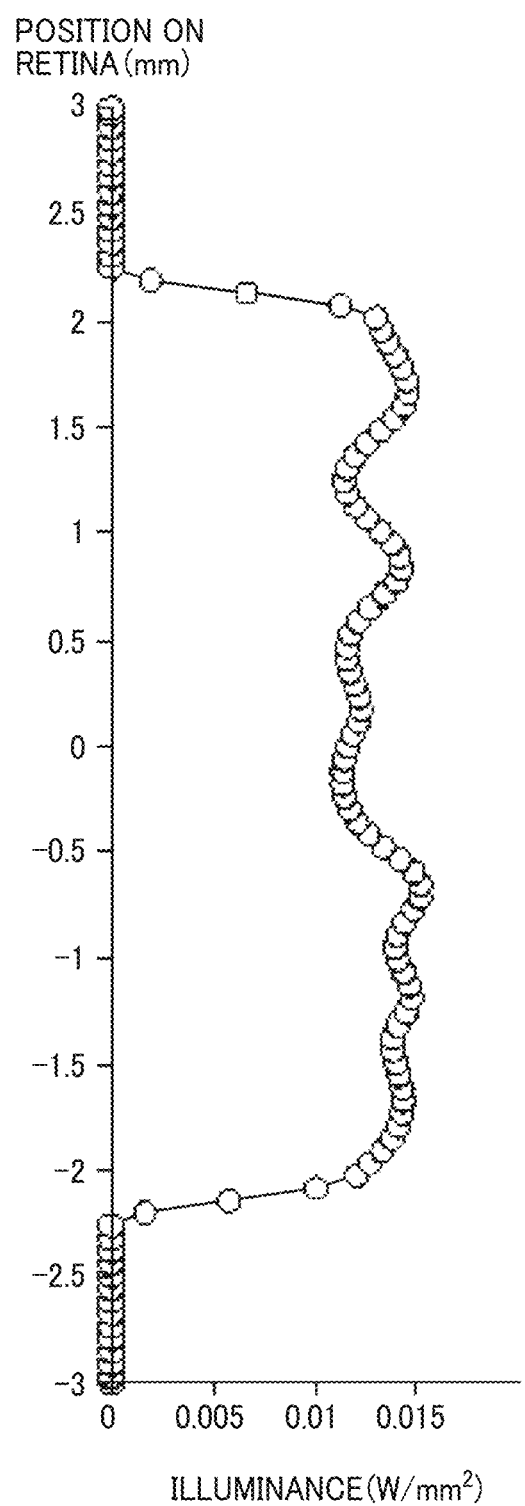
FIG. 10 is a graph of the variations in light intensity according to the third embodiment.

FIGS. 9 and 10 are similar to FIGS. 5 and 6, respectively. FIG. 9 is an illustration of a model of a light guide 30 used in simulation according to the third embodiment. FIG. 10 is a graph of the variations in light intensity, i.e., the relation between the position of a virtual image on the retina of the eyes EY and the illuminance, calculated by simulation according to the third embodiment.

However, the light guide 30 according to the third embodiment has a light use efficiency of 23%, which means that the second embodiment achieves a high light use efficiency. As presented in FIG. 10, the variations in light intensity are reduced to 30%. With such a light guide, the wearer can observe a virtual image without a sense of discomfort.

A specific numerical configuration of the HMD 1 according to the third embodiment is as follows. As listed below, the third embodiment satisfies all of the conditional expressions (1) to (5). The third embodiment satisfying conditional expressions (1) to (5) exhibit all the advantageous effects as described above.

First Light Guide Portion 32
  Thickness (dimension in the Z-direction)
  2.5 mm
  Length (dimension in the Y-direction)
  37 mm
  Width (dimension in the X-direction)
  13 mm
  Angle between the entrance surface 320a of the optical entrance 320 and the reflecting surface 321
  26.5°
  Angle between the vertical direction (the X-direction) and the reflecting surface 322
  55°
Reflecting Surface 323
The Number of Reflecting Surfaces 323
  7 (all the reflecting surfaces 323 are partial reflection surfaces)
  Angle θ
  55°
Reflectance for an Incident Angle of 45°
  R1: 16.5%
  R2: 19.5%
  R3: 20%
  R4: 30%
  R5: 32.6%
  R6: 35%
  R7: 50%
LV1/LV
0.16
Interval d Between Reflecting Surfaces 323
  d(1,2): 1.7 mm
  d (2, 3): 2.1 mm
  d (3, 4): 2.0 mm
  d (4, 5): 2.2 mm
  d (5, 6): 1.95 mm
  d (6, 7): 1.8 mm
Second Light Guide Portion 34
  Thickness (dimension in the Z-direction)
  2.5 mm
  Length (dimension in the Y-direction)
  37 mm
  Width (dimension in the X-direction)
  27 mm
  Angle between the optical entrance (the third surface 342) and the partial reflection surface 344
  26.5°

Fourth Embodiment

Figure 11:
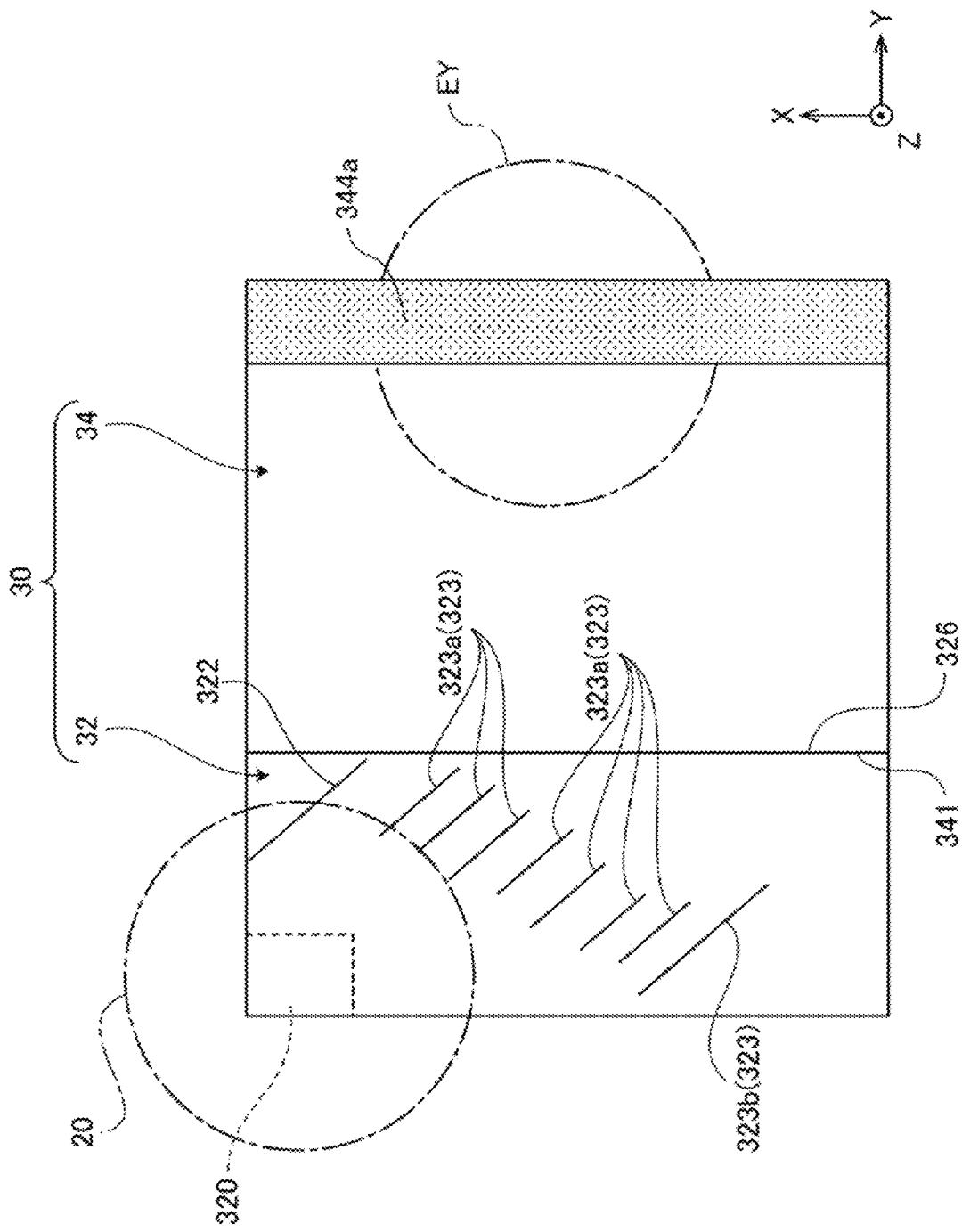
FIG. 11 is an illustration of a model of a light guide used in simulation according to a fourth embodiment.
Figure 12:
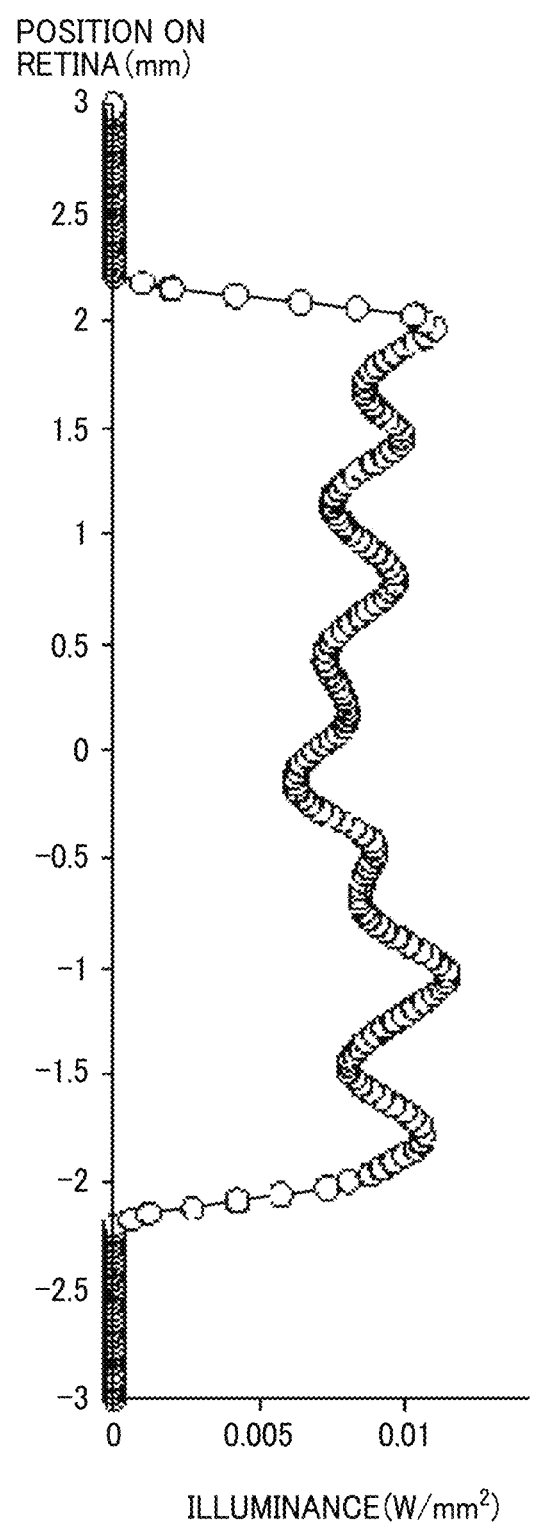
FIG. 12 is a graph of the variations in light intensity according to a furth embodiment.

FIGS. 11 and 12 are similar to FIGS. 5 and 6, respectively. FIG. 11 is an illustration of a model of a light guide 30 used in simulation according to the fourth embodiment. FIG. 12 is a graph of the variations in light intensity, i.e., the relation between the position of a virtual image on the retina of the eyes EY and the illuminance, calculated by simulation according to the fourth embodiment.

However, the light guide 30 according to the fourth embodiment has a light use efficiency of 23%, which means that the second embodiment achieves a high light use efficiency. As presented in FIG. 12, the variations in light intensity are reduced to 40%. With such a light guide, the wearer can observe a virtual image without a sense of discomfort.

A specific numerical configuration of the HMD 1 according to the fourth embodiment is as follows. As listed below, the fourth embodiment satisfies all of the conditional expressions (1) to (5). The fourth embodiment satisfying conditional expressions (1) to (5) exhibit all the advantageous effects as described above.

First Light Guide Portion 32
  Thickness (dimension in the Z-direction)
  2.5 mm
  Length (dimension in the Y-direction)
  37 mm
  Width (dimension in the X-direction)
  13 mm
  Angle between the entrance surface 320a of the optical entrance 320 and the reflecting surface 321
  23°
  Angle between the vertical direction (the X-direction) and the reflecting surface 322
  40°
Reflecting Surface 323
The Number of Reflecting Surfaces 323
  8 (all the reflecting surfaces 323 are partial reflection surfaces)
  Angle θ
  40°

Reflectance for an Incident Angle of 45°
  R1: 12%
  R2: 15%
  R3: 23%
  R4: 25%
  R5: 28%
  R6: 30%
  R7: 32%
  R8: 50%
  LV1/LV
  0.23
Interval d Between Reflecting Surfaces 323
  d (1, 2): 2.1 mm
  d (2, 3): 2.35 mm
  d (3, 4): 2.45 mm
  d (4, 5): 2.75 mm
  d (5, 6): 2.75 mm
  d (6, 7): 2.1 mm
  d (7, 8): 2.1 mm
Second Light Guide Portion 34
  Thickness (dimension in the Z-direction)
  2.5 mm
  Length (dimension in the Y-direction)
  37 mm
  Width (dimension in the X-direction)
  27 mm
  Angle between the optical entrance (the third surface 342) and the partial reflection surface 344
  23°

Fifth Embodiment

Figure 13:
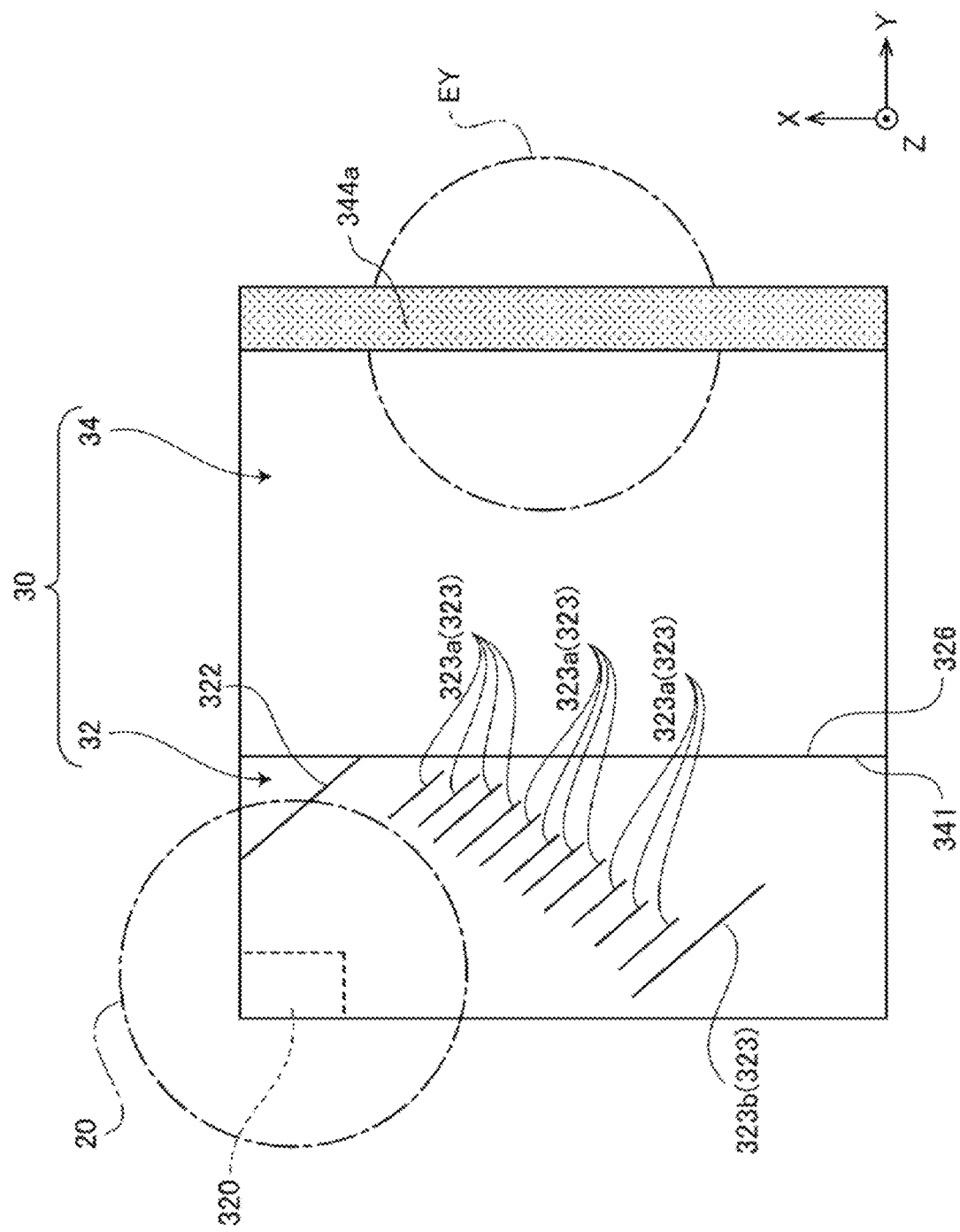
FIG. 13 is an illustration of a model of a light guide used in simulation according to a fifth embodiment.
Figure 14:
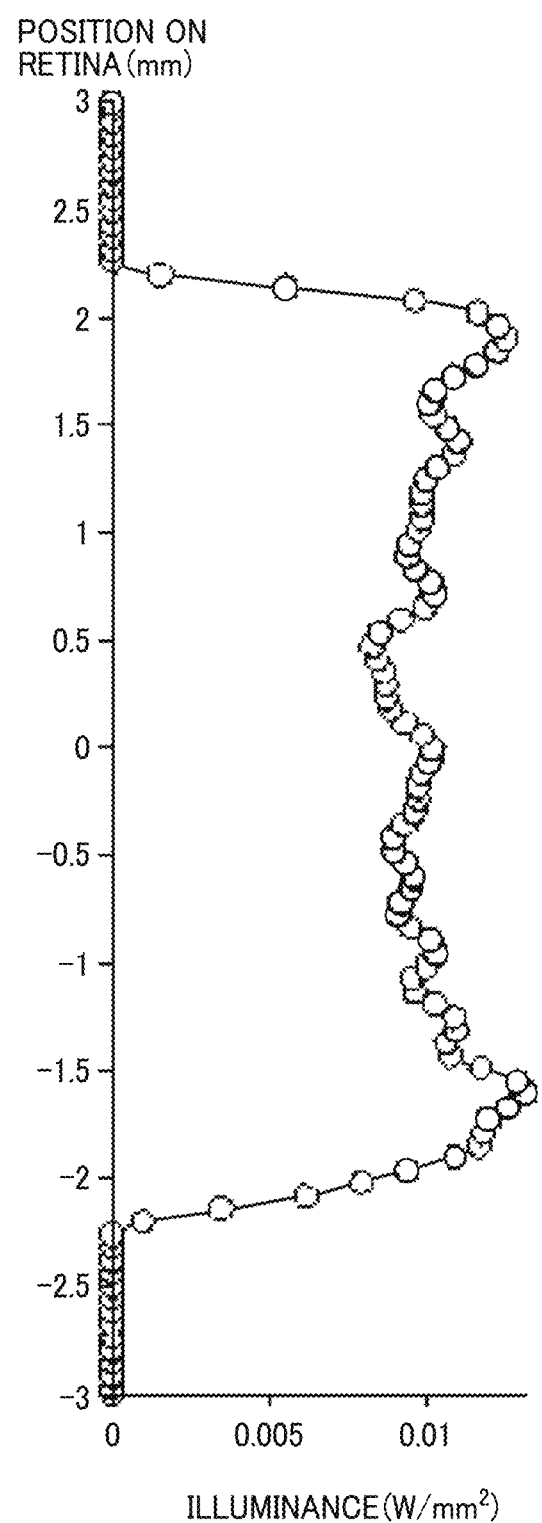
FIG. 14 is a graph of the variations in light intensity according to the fifth embodiment.

FIGS. 13 and 14 are similar to FIGS. 5 and 6, respectively. FIG. 13 is an illustration of a model of a light guide 30 used in simulation according to the fifth embodiment. FIG. 14 is a graph of the variations in light intensity. i.e., the relation between the position of a virtual image on the retina of the eyes EY and the illuminance, calculated by simulation according to the fifth embodiment.

However, the light guide 30 according to the fifth embodiment has a light use efficiency of 30%, which means that the second embodiment achieves a high light use efficiency. As presented in FIG. 14, the variations in light intensity are reduced to 40%. With such a light guide, the wearer can observe a virtual image without a sense of discomfort.

A specific numerical configuration of the HMD 1 according to the fifth embodiment is as follows. As listed below, the fifth embodiment satisfies all of the conditional expressions (1) to (5). The fifth embodiment satisfying conditional expressions (1) to (5) exhibit all the advantageous effects as described above.
First Light Guide Portion 32
  Thickness (dimension in the Z-direction)
  1.5 mm
  Length (dimension in the Y-direction)
  37 mm
  Width (dimension in the X-direction)
  14 mm
  Angle between the entrance surface 320a of the optical entrance 320 and the reflecting surface 321
  22°
  Angle between the vertical direction (the X-direction) and the reflecting surface 322
  40°
  Reflecting Surface 323
  The Number of Reflecting Surfaces 323
    12 (all the reflecting surfaces 323 are partial reflection surfaces)
  Angle θ
  40°
  Reflectance for an Incident Angle of 45°
    R1: 10%
    R2: 15%
    R3: 20%
    R4: 23%
    R5: 25%
    R6: 27%
    R7: 28%
    R8: 32%
    R9: 35%
    R10: 35%
    R11: 40%
    R12: 50%
  LV1/LV
  0.01
  Interval d Between Reflecting Surfaces 323
    d (1, 2): 1.4 mm
    d (2, 3): 1.15 mm
    d (3, 4): 1.4 mm
    d (4, 5): 1.3 mm
    d (5, 6): 1.55 mm
    d (6, 7): 1.45 mm
    d (7, 8): 1.45 mm
    d (8, 9): 1.7 mm
    d (9, 10): 1.7 mm
    d(10, 11): 1.8 mm
    d (11, 12): 1.7 mm
Second Light Guide Portion 34
  Thickness (dimension in the Z-direction)
  1.5 mm
  Length (dimension in the Y-direction)
  37 mm
  Width (dimension in the X-direction)
  27 mm
  Angle between the optical entrance (the third surface 342) and the partial reflection surface 344
  22°

Sixth Embodiment

Figure 15:
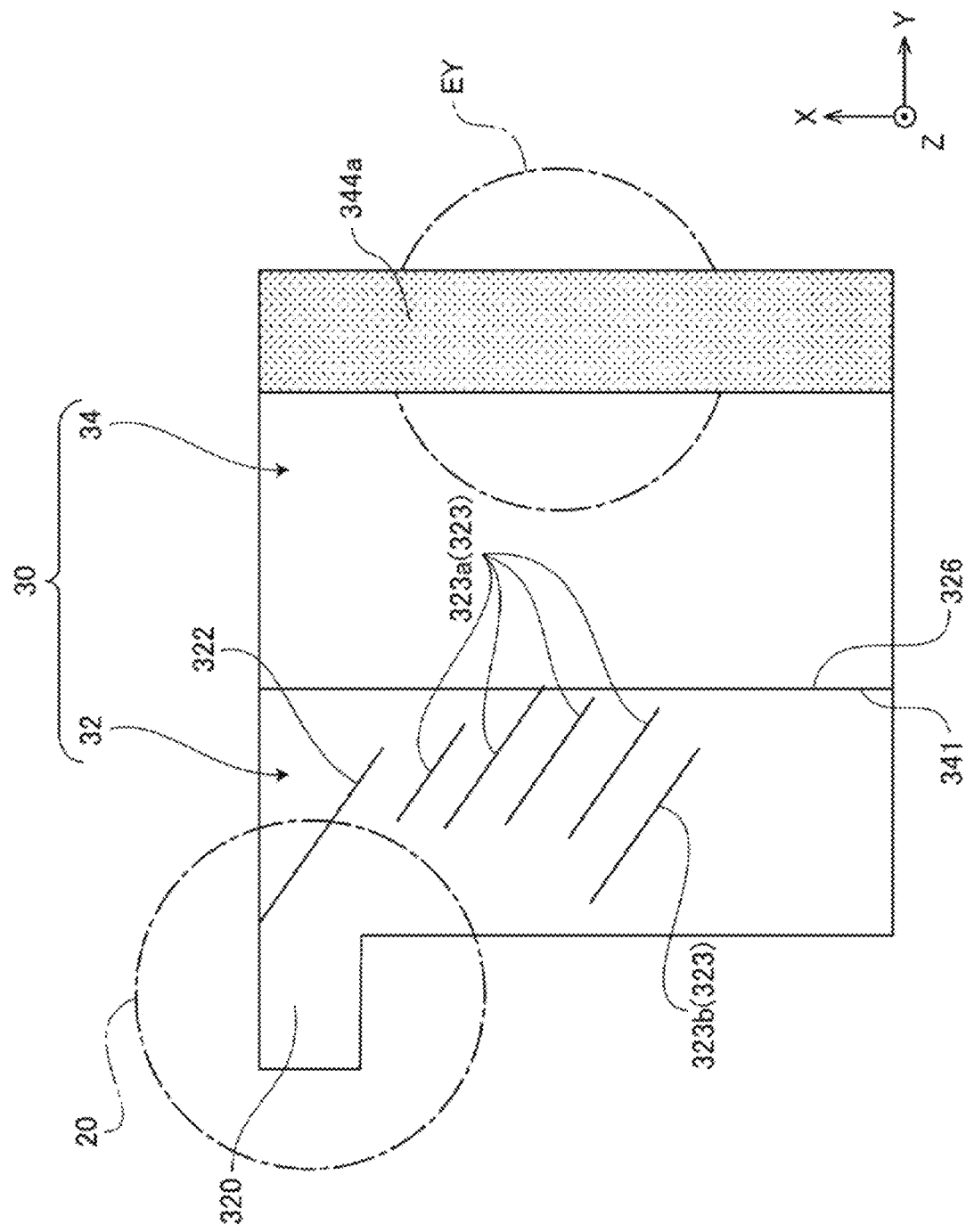
FIG. 15 is an illustration of a model of a light guide used in simulation according to a sixth embodiment.
Figure 16:
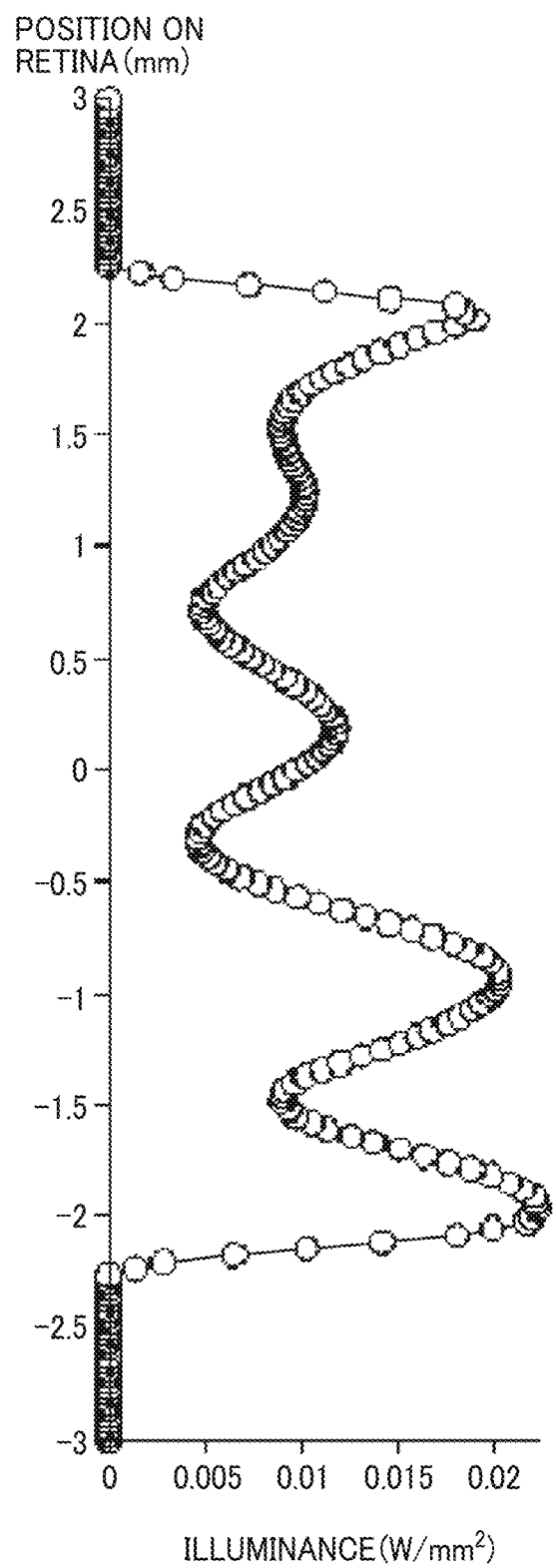
FIG. 16 is a graph of the variations in light intensity according to the sixth embodiment.

FIGS. 15 and 16 are similar to FIGS. 5 and 6, respectively. FIG. 15 is an illustration of a model of a light guide 30 used in simulation according to the sixth embodiment. FIG. 16 is a graph of the variations in light intensity, i.e., the relation between the position of a virtual image on the retina of the eyes EY and the illuminance, calculated by simulation according to the sixth embodiment.

However, the light guide 30 according to the sixth embodiment has a light use efficiency of 23%, which means that the second embodiment achieves a high light use efficiency. As presented in FIG. 16, the variations in light intensity are reduced to 80%. In this case, the wearer can observe the variations in light intensity within an image without visually identifying chipping therein. In other words, the sixth embodiment provides a favorable image.

A specific numerical configuration of the HMD 1 according to the sixth embodiment is as follows. As listed below, the sixth embodiment satisfies all of the conditional expressions (1) to (5). The sixth embodiment satisfying conditional expressions (1) to (5) exhibit all the advantageous effects as described above.

First Light Guide Portion 32
  Thickness (dimension in the Z-direction)
  3.5 mm
  Length (dimension in the Y-direction)
  37 mm
  Width (dimension in the X-direction)
  12 mm
  Angle between the entrance surface 320a of the optical entrance 320 and the reflecting surface 321
  26.5°
  Angle between the vertical direction (the X-direction) and the reflecting surface 322
  40°
Reflecting Surface 323
The Number of Reflecting Surfaces 323
  5 sheets (4 of 5 sheets are partial reflection surfaces)
  Angle θ
  55°
Reflectance for an Incident Angle of 45°
  R1: 10%
  R2: 15%
  R3: 40%
  R4: 20%
  R5: 100% (reflecting surface which is not a partial reflection surface)
  LV1/LV
  0.19
Interval d Between Reflecting Surfaces 323
  d (1, 2): 2.7 mm
  d (2, 3): 2.9 mm
  d (3, 4): 3.4 mm
  d (4, 5): 3.1 mm
Second Light Guide Portion 34
  Thickness (dimension in the Z-direction)
  3.5 mm
  Length (dimension in the Y-direction)
  37 mm
  Width (dimension in the X-direction)
  27 mm
  Angle between the optical entrance (the third surface 342) and the partial reflection surface 344
  26.5°

The above is a description of exemplary embodiments of the present invention. The embodiments of the present invention are not limited to those described above, and various modifications are possible within the scope of the technical idea of the present invention. For example, the embodiments of the present application also include contents obtained by appropriately combining the embodiments explicitly described in the specification or the obvious embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A light guide comprising:
  a first light guide portion including:
    an optical entrance; and
    multiple reflecting surfaces including at least one first reflecting surface and at least one second reflecting surface, the multiple reflecting surfaces configured to separate a light flux entered through the optical entrance, into multiple light fluxes; and
  a second light guide portion including:
    an optical exit, and
    multiple partial reflection surfaces,
  wherein the second light guide portion is configured to cause the multiple light fluxes to propagate therethrough,
  wherein the multiple partial reflection surfaces are configured to deflect the multiple light fluxes entering the second light guide portion in directions corresponding to angles at which the multiple partial reflection surfaces are oriented, and to cause the multiple light fluxes to exit from the optical exit,
  wherein the light guide is configured to guide a part of the light flux to strike and reflect off the at least one first reflecting surface and propagate into the second light guide portion,
  wherein the light guide is configured to guide another part of the light flux to strike and reflect off the at least one second reflecting surface without striking the at least one first reflecting surface, and propagate into the second light guide portion,
  wherein the at least one second reflecting surface is farther from the optical entrance along an optical path than the at least one first reflecting surface is from the optical entrance,
  wherein the at least one second reflecting surface does not transmit incident light,
  wherein the at least one first reflecting surface includes at least one partially reflective surface that transmits a part of light striking the at least one first reflecting surface, and
  wherein at least two of the multiple reflecting surfaces each have a different area.

2. The light guide according to claim 1,
wherein the first light guide portion includes a first surface and a second surface parallel to each other and orthogonal to each of the at least one first reflecting surface and the at least one second reflecting surface, and
wherein each of the at least one first reflecting surface and the at least one second reflecting surface is between the first surface and the second surface.

3. The light guide according to claim 1,
wherein one of the at least one first reflecting surface is closest to the optical entrance along the optical path among the multiple reflecting surfaces.

4. The light guide according to claim 1,
wherein conditional expression below is satisfied:

$$0.001 < LV1/LV < 0.5$$

where
LV is a total light intensity of light fluxes exiting from the second light guide portion after striking an entrance surface of the optical entrance at an incident angle of 90 degrees and reflecting off each of the multiple reflecting surfaces; and
LV1 is a light intensity of a light flux exiting from the second light guide portion after striking the entrance surface of the optical entrance at an incident angle of 90 degrees and reflecting off one of the at least one first reflecting surface, closest to the optical entrance along an optical path among the multiple reflecting surfaces.

5. The light guide according to claim 1,
wherein the first light guide portion further includes a third reflecting surface configured to reflect the light flux entered through the optical entrance toward the multiple reflecting surfaces without transmitting the light flux.

6. The light guide according to claim 1,
wherein the at least one first reflecting surface includes at least one partially reflective surface that transmits a part of light striking the at least one first reflecting surface, and
wherein the multiple reflecting surfaces are parallel to each other.

7. The light guide according to claim 6,
wherein conditional expression below is satisfied:

$$0.5 \text{ mm} < d < 4 \text{ mm}$$

where
d is an interval between the multiple reflecting surfaces.

8. The light guide according to claim 1,
wherein the light flux is light containing information on an image emitted from an image display element; and
wherein conditional expression below is satisfied:

$$30° < \theta < 60°$$

wherein, in the light guide, a direction in which the first light guide portion and the second light guide portion are arranged is a Y direction, and a direction orthogonal to the Y direction and orthogonal to a direction in which a virtual image is emitted is an X direction, and
wherein $\theta$ is an angle between each of the multiple reflecting surfaces and the X direction.

9. The light guide according to claim 1,
wherein conditional expression below is satisfied:

$$4 \leq N \leq 14$$

where
N is the number of the multiple reflecting surfaces.

10. The light guide according to claim 1,
wherein conditional expression below is satisfied:

$$5\% < R1 < 40\%$$

where
R1 is a reflectance of one of the at least one first reflecting surface, closest to the optical entrance along an optical path among the multiple reflecting surfaces, on which a part of the light flux has struck at an angle of 45°.

11. The light guide according to claim 1,
wherein the at least one first reflecting surface includes multiple first reflecting surfaces, each being a partially reflective surface configured to transmit a part of light striking a corresponding one first reflecting surface of the multiple first reflecting surfaces, and
wherein the multiple first reflecting surfaces include:
a first partially reflective surface; and
a second partially reflective surface farther from the optical entrance along an optical path than the first partially reflective surface, and
wherein a reflectance is higher for the second partially reflective surface on which a part of the light flux has struck at an angle of 45° than for the first partially reflective surface on which another part of the light flux has struck at an angle of 45°.

12. The light guide according to claim 1,
wherein the second light guide portion includes two surfaces parallel to each other, the two surfaces configured to guide and deflect each of the multiple light fluxes entered from the first light guide portion, so as to allow the multiple light fluxes to exit through the optical exit of the light guide.

13. The light guide according to claim 1,
wherein the first light guide portion and the second light guide portion are separate from each other, and
wherein the first light guide portion includes an exit surface from which the multiple light fluxes exit; and
wherein the second light guide portion includes an entrance surface on which the multiple light fluxes exited from the exit surface strike, and
wherein the exit surface and the entrance surface are parallel to each other.

14. An optical unit comprising:
the light guide according to claim 1; and
an optical system configured to cause light from a light source to strike the optical entrance of the light guide as parallel light.

15. A virtual image display device comprising:
an image display element configured to display an image; and
the optical unit according to claim 14 configured to receive light containing information on the image from the image display element,
wherein the optical system causes the received light to strike the optical entrance of the light guide.

16. A head-mounted display comprising:
an image display element configured to display an image; and
the optical unit according to claim 14 configured to receive light containing information on the image from the image display element,
wherein the optical system causes the received light to strike the optical entrance of the light guide.

17. A light guide comprising:
a first light guide portion including:
an optical entrance; and
multiple reflecting surfaces including at least one first reflecting surface and at least one second reflecting surface, the multiple reflecting surfaces configured to separate a light flux entered through the optical entrance, into multiple light fluxes; and
a second light guide portion including:
an optical exit, and
multiple partial reflection surfaces,
wherein the second light guide portion is configured to cause the multiple light fluxes to propagate therethrough,
wherein the multiple partial reflection surfaces are configured to deflect the multiple light fluxes entering the second light guide portion in directions corresponding to angles at which the multiple partial reflection surfaces are oriented, and to cause the multiple light fluxes to exit from the optical exit,
wherein the light guide is configured to guide a part of the light flux to strike and reflect off the at least one first reflecting surface and propagate into the second light guide portion,
wherein the light guide is configured to guide another part of the light flux to strike and reflect off the at least one second reflecting surface without striking the at least one first reflecting surface, and propagate into the second light guide portion,
wherein the at least one second reflecting surface is farther from the optical entrance along an optical path than the at least one first reflecting surface is from the optical entrance,
wherein the at least one second reflecting surface does not transmit incident light,
wherein the at least one first reflecting surface includes multiple first reflecting surfaces, each being a partially reflective surface configured to transmit a part of light striking a corresponding one first reflecting surface of the multiple first reflecting surfaces, and wherein the multiple first reflecting surfaces include:
a first partially reflective surface; and
a second partially reflective surface farther from the optical entrance along an optical path than the first partially reflective surface, and wherein a reflectance is higher for the second partially reflective surface on which a part of the light flux has struck at an angle of 45° than for the first partially reflective surface on which another part of the light flux has struck at an angle of 45°.

18. A light guide comprising:
a first light guide portion including:
an optical entrance; and
multiple reflecting surfaces including at least one first reflecting surface and at least one second reflecting surface, the multiple reflecting surfaces configured to separate a light flux entered through the optical entrance, into multiple light fluxes; and
a second light guide portion including:
an optical exit, and
multiple partial reflection surfaces, wherein the second light guide portion is configured to cause the multiple light fluxes to propagate therethrough, wherein the multiple partial reflection surfaces are configured to deflect the multiple light fluxes entering the second light guide portion in directions corresponding to angles at which the multiple partial reflection surfaces are oriented, and to cause the multiple light fluxes to exit from the optical exit, wherein the light guide is configured to guide a part of the light flux to strike and reflect off the at least one first reflecting surface and propagate into the second light guide portion, wherein the light guide is configured to guide another part of the light flux to strike and reflect off the at least one second reflecting surface without striking the at least one first reflecting surface, and propagate into the second light guide portion, wherein the at least one second reflecting surface is farther from the optical entrance along an optical path than the at least one first reflecting surface is from the optical entrance, wherein the at least one second reflecting surface does not transmit incident light, wherein the first light guide portion and the second light guide portion are separate from each other, wherein the first light guide portion includes an exit surface from which the multiple light fluxes exit;

wherein the second light guide portion includes an entrance surface on which the multiple light fluxes exited from the exit surface strike, and wherein the exit surface and the entrance surface are parallel to each other.

* * * * *